United States Patent
Zhu et al.

(10) Patent No.: US 11,445,737 B2
(45) Date of Patent: Sep. 20, 2022

(54) PLANT PROTEIN SNACK WITH MEAT-LIKE TEXTURE

(71) Applicant: FRITO-LAY NORTH AMERICA, INC., Plano, TX (US)

(72) Inventors: Yi Zhu, Plano, TX (US); James Coomes, Plano, TX (US); Thomas Trezza, Plano, TX (US); Charlene Gladden, Plano, TX (US)

(73) Assignee: Frito-Lay North America, Inc., Plano, TX (US)

( * ) Notice: Subject to any disclaimer, the term of this patent is extended or adjusted under 35 U.S.C. 154(b) by 234 days.

(21) Appl. No.: 16/562,969

(22) Filed: Sep. 6, 2019

(65) Prior Publication Data
US 2021/0068420 A1    Mar. 11, 2021

(51) Int. Cl.
*A23J 3/22* (2006.01)
*A23J 3/14* (2006.01)
*A23J 3/26* (2006.01)

(52) U.S. Cl.
CPC .............. *A23J 3/227* (2013.01); *A23J 3/14* (2013.01); *A23J 3/26* (2013.01)

(58) Field of Classification Search
CPC ...... A23J 3/227; A23J 3/14; A23J 3/26; A23J 3/16
USPC .......................................... 426/656
See application file for complete search history.

(56) References Cited

U.S. PATENT DOCUMENTS

| | | | |
|---|---|---|---|
| 5,160,758 A | | 11/1992 | Parkers et al. |
| 5,922,392 A | * | 7/1999 | Kelly ............. A23K 10/00 426/635 |
| 7,597,921 B2 | | 10/2009 | Walsh et al. |
| 7,887,870 B2 | | 2/2011 | McMindes et al. |
| 8,685,485 B2 | | 4/2014 | McMindes et al. |
| 10,477,882 B1 | * | 11/2019 | Wang ............ A23L 1/3055 |
| 2015/0296834 A1 | * | 10/2015 | Geistlinger ....... A23J 3/227 426/657 |

FOREIGN PATENT DOCUMENTS

WO    WO-2007137125 A2 *  11/2007  ............. A23L 13/52

* cited by examiner

*Primary Examiner* — Hamid R Badr
(74) *Attorney, Agent, or Firm* — Barnes & Thornburg LLP; Jessamine G. Pilcher

(57) ABSTRACT

A plant protein snack with meat-like texture food product generally includes a plant based structured product having layered fibers that are cross-linked yet generally aligned along a longitudinal axis and that mimics the look and organoleptic properties of meat jerky products. Methods of making the food product are described.

17 Claims, 8 Drawing Sheets

PLANT PROTEIN SNACK WITH MEAT-LIKE TEXTURE

The present disclosure relates to a plant protein snack with meat-like texture that mimics meat jerky products.

BACKGROUND

Jerky is a nutrient-dense meat product with high protein content, low calories, and shelf stability that has been made lightweight by drying. Jerky may be made from various meats, including, but not limited to turkey, beef (e.g., steak), chicken, pork (e.g., bacon), and bison. In spite of some of the more healthy options (e.g., turkey jerky), in most commercial markets, beef jerky remains the most popular.

However, consumers are increasingly health conscious and are concerned with environmental sustainability and animal welfare. These consumers seek healthier food and snack options, particularly alternatives such as plant-based and/or meatless jerky products.

Primarily due to its high protein and low fat content, it has been attempted to use plant derived material to manufacture edible products that resemble those made from real meat. Attempts at making a vegetable-based or vegetable containing jerky style meat snacks have thus far met with poor results. In addition to overcoming problems with extruding plant mixtures, it has been difficult to adequately mimic the flavor and texture properties of meat jerky products.

SUMMARY

According to one aspect of the disclosure, a plant protein snack with meat-like texture is described. The product generally includes a plant based structured product having layered fibers that are cross-linked yet generally aligned along a longitudinal axis and that mimics the look and organoleptic properties of meat jerky products.

The fibers and the food product, include a plant-based protein source and a plurality of dry ingredients that may include flavorants, colorants, and acidulants. The plant-based protein source may include but is not limited to a plant extract, a plant meal, a plant-derived flour, a plant protein isolate, a plant protein concentrate, and combinations thereof. The plant-based protein snack food product may also comprise about 35 wt % to about 90 wt % of one or more plant protein sources. For example, an embodiment of the plant-based protein snack food product may comprise greater than about 35 wt % or greater than about 70 wt % of the one or more plant protein sources. The plant-based protein snack food product may also comprise about 1 wt % to about 99 wt % of the one or more dry ingredients.

Plant protein sources of the plant-based protein snack food product include a nut, grain, and/or legume protein. More specifically, the plant protein sources include pea protein, black bean protein, green bean protein, red bean protein, pinto bean protein, broad bean protein, mung bean protein, navy bean protein, chickpea protein, lentil protein, lupin bean protein, soy bean protein, peanut protein, alfalfa protein, wheat, wheat gluten, rice, corn, maize, oats, barley, sorghum, rye, millet, amaranth, buckwheat, bulgur, quinoa, pea fiber, soy fiber, oat fiber, corn fiber, sugar cane fiber, sugar beet fiber, and combinations thereof. However, some embodiments do not comprise a leavening agent.

In some aspects, the fibers comprising the food product have a cross-sectional area that may range from about 6 mm$^2$ to about 8.5 mm$^2$. In other aspects of the present food product, the fibers have an average equidiameter size between about 3 mm to about 4 mm, an aspect ratio in the range of about 0.4 to about 0.6, and a circularity in the range of about 0.3 to about 0.55. In some embodiments, food products formed from the above fibers exhibit a pulling force of at least 3,500 g force or from about 5,000 to about 7,000 g force, which substantially mimics the pulling force of known commercial beef jerky products.

Another aspect of the present disclosure relates to methods of making the plant protein snack with meat-like texture product. The method includes a) introducing one or more protein sources, a plurality of dry ingredients, and a medium to form an in-barrel mixture b) mixing the in-barrel mixture, c) heating the in-barrel mixture to a temperature that ranges from about 180° F. to about 320° F. to form a melt, d) extruding the melt through a perforation plate to form a plurality of fiber strands, e) compressing the plurality of fiber strands through a receptor slit of a die assembly to form an extrudate comprising overlaid and crosslinked fiber strands substantially aligned in a flow direction, wherein the cross-sectional area of each of the plurality of fiber strands ranges from about 6 mm$^2$ to about 7.75 mm$^2$, and f) cooling the extrudate at a temperature that ranges from about 150° F. to about 220° F., with a "cooling water" temperature ranging from about 130° F. to about 160° F. An exemplary embodiment of an extrudate exiting the cooling die has a temperature of about 195° F. Thereafter, the extrudate may be dried or dehydrated to form the plant protein snack with meat-like texture product. Optionally, the extrudate may be tenderized and/or marinated (i.e., flavor treated) prior to drying.

Notably, the mixing of the present method is performed at a screw speed ranging from about 350 rpm to about 450 rpm. An exemplary embodiment of a screw speed range for the present method and composition is about 396 rpm. In addition, the method further comprises seasoning, tenderizing, marinating, and drying the extrudate. The moisture content of the in-barrel mixture of the method may range from about 40 wt % to about 65 wt %.

The perforation plate of the method has a plurality of perforations with each perforation having a diameter that ranges from about 2.5 mm to about 3.0 mm. One embodiment of the receptor slit of the die assembly used for the method has dimensions of about 4 mm in height by about 50 mm in width. In an additional embodiment, the receptor slit of the die assembly used for the method has dimensions of about 4 mm in height by about 150 mm in width. As this is a scalable process, additional perforation plate and/or receptor die embodiments having similar or proportional dimensionality may also be used. Finally, the present disclosure is also directed to a plant-based protein food product produced by the present method.

Unless otherwise noted, all percentages used in this description refer to a percent by weight.

BRIEF DESCRIPTION OF THE DRAWINGS

The following description accompanies the drawings, all given by way of non-limiting examples that may be useful to understand the described process.

DESCRIPTION

Figure 1:
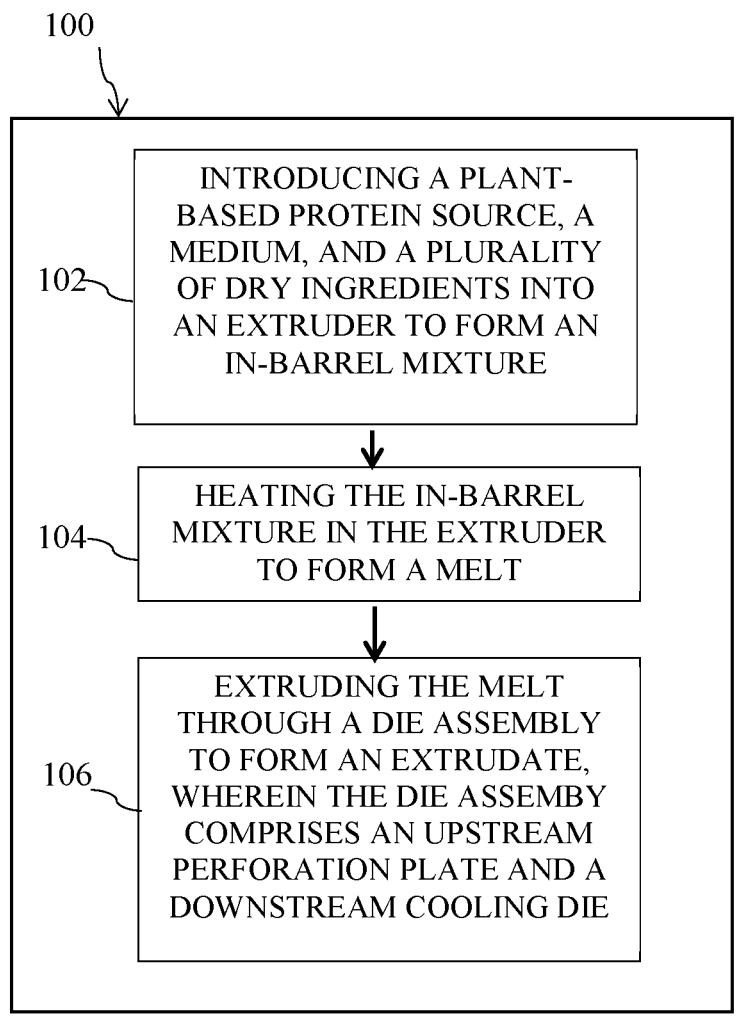
FIG. 1 is a flow chart depicting one general embodiment of the present methods of making and/or producing a plurality of plant-based protein snack food products of the present disclosure.

Plant Protein Snack with Meat-Like Texture Product

As noted above, the plant protein snack with meat-like texture food product is generally formed as a structured product having layered fibers that are cross-linked yet generally aligned along a longitudinal (length-wise) axis and that mimics the look and organoleptic properties of meat jerky products. The fibers and thus, the food product, include a plant-based protein source and a plurality of dry ingredients that may include flavorants, colorants, acidulants, and the like.

The plant-based protein product of the present disclosure comprises about 30% to about 95% of one or more protein sources. More specifically, the present product embodiments may comprise about 40% to about 90%, from about 45% to about 85%, from about 50% to about 80%, from about 55% to about 75%, from about 60% to about 70%, from about 70% to about 95%, from about 75% to about 90%, from about 80% to about 85%, from at least 35%, from greater than 35%, from at least 70%, from greater than 70%, from at least 75, from greater than 75%, from at least 80%, from greater than 80%, from at least 90%, from greater than 90% of one or more protein sources. In an illustrative embodiment, the present protein product comprises, consists essentially of, or consists of about 35%, about 40%, about 45%, about 50%, about 55%, about 60%, from about 65%, from about 70%, from about 75%, from about 80%, from about 85%, from about 90%, from about 95% of one or more protein sources. In an illustrative embodiment, the protein product of the present disclosure may comprise, consist essentially of, or consist of greater than 30% or greater than 35% of the one or more protein sources. In another embodiment, the protein product may comprise, consist essentially of, or consist of greater than 70%, greater than 75%, greater than 80%, greater than 85%, greater than 90%, and greater than 95% of the one or more protein sources.

The protein source may include but is not limited to any plant protein, particularly nut, grain, and/or legume proteins. The legume proteins may comprise a pea protein, a bean protein (e.g., black, green, red, pinto, broad, mung, and/or navy beans), a chickpea protein, a lentil protein, a lupin bean protein, a soy bean protein, a peanut protein, an alfalfa protein, and combinations thereof. The grain proteins may be derived from wheat, rice, corn, maize, oats, barley, sorghum, rye, millet, amaranth, buckwheat, bulgur, quinoa, and combinations thereof. The protein source may also comprise nutritional fiber sources, such as pea fiber, soy fiber, oat fiber, corn fiber, sugar cane fiber, sugar beet fiber, and combinations thereof. In exemplary embodiments, the protein source of the present plant-based composition comprises pea protein, pea fiber, pea powder, wheat protein (e.g., wheat gluten), soybean protein, soy protein (e.g., textured soy protein), soy flour, and/or combinations thereof.

Any form of the one or more protein sources may be used in the product of the present disclosure. For example, the protein source may be in any form that includes, but is not limited to a milk, a butter, a paste, a powder, a liquid, a gel, a cube (e.g., a bullion), a tablet, a puree, etc. An exemplary form of the protein source is in the form of a dry ingredient, such as a powder, a meal, a flour, granules, agglomerates, flakes, or combinations thereof.

The protein source is added to increase the protein content in the final snack food product to a protein content ranging between about 1 grams (g) to about 20 g of protein per serving. For example, the protein source may help increase the final protein content of the snack food product to range between about 2 g to about 19 g, from about 3 g to about 18 g, from about 4 g to about 17 g, from about 5 g to about 16 g, and from about 6 g to about 15 g per serving. Thus, addition of the one or more protein sources may increase the protein content of the final snack food product by over 5%, over 10%, over 15%, over 16%, over 17%, over 18%, over 19%, or over 25% per serving compared to prior art products. More specifically, the addition of the protein source may increase the protein content and/or concentration of the protein in the snack food product to a range of about 3% to about 30%, from about 4% to about 28%, from about 5% to about 26%, from about 6% to about 24%, from about 10% to about 35%, from about 15% to about 30%, from about 20% to about 30%, and from about 20% to about 25% per serving.

The amount and/or concentration of the plurality of dry ingredients (wt %) comprised in the plant-based protein product substantially corresponds to the amount and/or concentration of solids (wt %) in the in-barrel mixture. The plant-based protein product of the present disclosure may comprise about 1% to about 99% (wt %) of a plurality of dry ingredients. More specifically, the base composition of the present disclosure may comprise from about 5% to about 95%, from about 25% to about 90%, from about 75% to about 95%, from about 85% to about 99%, from about 55% to about 85%, from about 2.5% to about 75%, from about 5% to about 70%, from about 7.5% to about 65%, from about 5% to about 74%, from about 8% to about 70%, from about 10% to about 60%, from about 15% to about 65%, from about 25% to about 55%, from about 35% to about 45%, from about 45% to about 65%, from about 50% to about 75%, about 55%, about 65%, about 45%, about 55%, about 65%, and about 75% of the plurality of dry ingredients. In an illustrative embodiment, the base composition comprises from about 45% to about 70%, such as about 60%, 70%, or less than 75% of the plurality of dry ingredients.

While any form of the plurality of dry ingredients may be used in the product of the present disclosure, an illustrative embodiment is a powder, a meal, a flour, granules, agglomerates, flakes or combinations thereof. For example, an exemplary embodiment of dry ingredients of the plant-based protein product of the present disclosure comprises a combination or a mixture of the plurality of dry ingredients. Dry ingredients of the present product comprise a plurality of compositions that include, but are not limited to thickeners, flavorings or flavoring agents, adjuvants, excipients, dispersants, emulsifiers, colorings (e.g., dyes), additives, probiotics, minerals, sugar, leavening agents, protein sources, mediums, etc. In some embodiments, the present product does not comprise any leavening agent, such as sodium bicarbonate, while other product embodiments may have extremely limited amounts of leavening agents (e.g., less than 0.5 wt %). In another embodiment, the present plant-based protein product does not comprise any sodium bicarbonate at all.

Illustrative dry ingredients of the present plant-based protein product may include, but are not limited to flour, brown sugar, sugar, char sugar, corn starch, spices, salt (e.g., iodized or sea salt), licorice root, tamari, D-sorbitol, maltose, yeast extract, licorice powder, caramel color, potassium sorbate, and/or colorings. Dry spices of the present product include, but are not limited to Onion Powder, Garlic Powder, Salt, Black Pepper, Mushroom Powder, Red Pepper, Ginger, vegetarian and/or vegan spices, natural smoke flavors, white pepper, cinnamon, prickly ash powder, and/or chili powder. Dry ingredients of the present product may also comprise a protein source described herein, including but not limited to pea protein, pea fiber, pea powder, wheat protein (e.g., wheat gluten), soy sauce, soybeans, soy protein (e.g., textured soy protein), soy flour, etc.

Notably, the plurality of dry ingredients may comprise small amounts of wet ingredients (e.g., liquids) that are added to the plurality of dry ingredients of the present disclosure. Illustrative wet ingredients that may be added to the dry ingredients of the present disclosure include, but are not limited to vinegar, soy sauce, lime juice, oil (e.g., soybean, olive, canola, and sesame oil), water, cane juice, alcohol (e.g., to preserve freshness), citric acid, flavorings, and colors, and others.

It will be appreciated that the finished plant protein snack with meat-like texture food product may comprise, consist essentially of, or consist of up to about 25% moisture and is typically has an intermediate water activity, such as ranging from about 0.50 to about 0.65 or a moisture content ranging from about 20-40%. Thus, one of ordinary skill will appreciate that to form the finished product, moisture may be added in the form of a medium to the plant-based protein and dry ingredients to form the in-barrel mixture that can be extruded.

An exemplary medium of the present plant-based protein product comprises a substantial amount of a liquid or solution that enables the combination and mixture of the plurality of dry ingredients. For example, the present plant-based protein product comprises about 1% to about 25% of a medium. More specifically, the product may comprise about 0% to about 24%, from about 1% to about 23%, from about 1% to about 22%, from about 1% to about 21%, from about 1% to about 20%, from about 5% to about 20%, from about 15% to about 20%, from about 15% to about 25%, from about 10% to about 25%, from about 5% to about 25%, from about 10% to about 20%, from about 1% to about 19%, from about 1% to about 18%, from about 1% to about 17%, from about 1% to about 16%, from about 1% to about 15%, from about 1% to about 14%, from about 1% to about 13%, from about 1% to about 12%, about 7%, 8%, 10%, and 25% of the medium. An exemplary medium for the plant-based protein product is a liquid medium. An illustrative liquid medium of the present disclosure is an aqueous solution, meaning it comprises about 90% or more of water by weight (wt %). An aqueous solution may comprise water, juice, (e.g., fruit and/or vegetable juice), and/or vinegar. Water is an exemplary medium solution of the present disclosure, including but not limited to tap water, purified water (e.g., reverse osmosis (RO) water), spring water, and/or distilled water.

The plant-based protein product may optionally comprise one or more additional components, such as one or more enhancers. Enhancers include, but are not limited to any composition or component used to improve the characteristics and/or features of the plant-based protein product of the present disclosure to a consumer. If optional enhancer components are added to the product of the present disclosure, the total concentration of the optional enhancer components comprise no more than about 0% to about 5% of the total plant-based protein product. More specifically, illustrative embodiments of the present product may comprise from about 0.1% to about 5%, from about 0.5% to about 4%, from about 0.1% to about 3%, from about 0.5% to about 2.5%, from about 0.1% to about 2%, from about 0.1% to about 1%, from about 0.1% to about 0.5%, and about 0.5% of the total of one or more enhancers.

Illustrative enhancers of the present product include, but are not limited to flavoring agents. Flavoring agents of the present disclosure may comprise any natural and/or artificial compositions or components used in the snack food arts to add and/or enhance the flavor of a product safe for human ingestion, including but not limited to spices, juices, condiments, rubs, oils, salts, etc. The flavoring agents may be added to the dry and/or wet ingredients directly as an "in-barrel mixture" in an extruder. Alternatively, flavoring and/or leavening agents may be added to a melt composition via a second feeder downstream the initial hopper of an extruder instrument.

An exemplary formula of an in-barrel mixture is provided in Table 1.

TABLE 1

| Plant-Based Protein Product Embodiment I | |
|---|---|
| Ingredients | % Ranges in BASE |
| Plurality of Dry Ingredients | 1-99% |
| Protein Source (e.g., Pea, Wheat, Soy Protein) | 30%-95% |
| Medium (e.g., Water) | 1-25% |
| Enhancer(s) | 0-5% |
| TOTAL | 100% |

The present plant-based protein snack food products may be in various physical forms, including, but not limited to patties, links, mash, strips, balls, etc. The plant-based products of the present disclosure may also be preserved, packaged, and/or presented in a variety of ways including, but not limited to fresh, frozen, canned, dried, freeze-dried, etc. An exemplary form of the present snack food product of the present disclosure is a dried product, such as a dried jerky product (i.e., jerky). An illustrative embodiment of the plant-based protein product of the present disclosure is a meatless snack food product, such as a meatless jerky. The snack food products of the present disclosure having a meat-like texture may comprise no (i.e., about 0%) meat and/or no quantifiable amount of meat. An illustrative embodiment of the meatless jerky of the present disclosure is a vegan jerky. Meatless and/or vegan products are illustrative embodiments of the plant-based protein snack food products of the present disclosure.

As noted above, the plant protein snack with meat-like texture food product is generally formed as a structured product having layered fibers that are cross-linked yet generally aligned along a longitudinal axis and that mimic the look and organoleptic properties of meat jerky products. The layering may include from 2 to 10 layers depending on the desired thickness of the end product. It will be appreciated, however, that the visual impression of the resulting product may not evidence discrete layers due to the crosslinking of individual fibers both horizontally and vertically.

The fibers have a cross-section that ranges from about 6 $mm^2$ to about 12 $mm^2$. In one embodiment, the fibers have a cross-section that ranges from about 6 $mm^2$ to about 8.5 $mm^2$, such as about 6 $mm^2$ to about 7.5 $mm^2$. This fiber cross-section compares favorably with known beef jerky products, which exhibit a cross-section from about 7.8 $mm^2$ to about 12 $mm^2$. In some embodiments, the cross-section of the present product ranges from about 6 $mm^2$ to about 8.3 $mm^2$, from about 8 $mm^2$ to about 10 $mm^2$, about 8 $mm^2$ to about 9 $mm^2$, about 7 $mm^2$ to about 8.2 $mm^2$, about 7 $mm^2$ to about 7.5 $mm^2$, about 7.25 $mm^2$ to about 8.05 $mm^2$, and about 9 $mm^2$ to about 11 $mm^2$. In other embodiments, the fiber cross-section of the present plant-based protein product ranges from about 6 $mm^2$ to about 7.75 $mm^2$, about 7 $mm^2$ to about 7.5 $mm^2$, or from about 7.3 $mm^2$ to about 8.1 $mm^2$. Current plant-based jerky products in the art comprise a cross-section that is significantly different. For example, domestic and international vegan jerky products on the current market typically comprise a "cross-section" of about 14 $mm^2$ to about 17 $mm^2$. The reduced or decreased cross-section of the present plant-based protein snack food product provides a texture that is less than, but similar to the texture of real meat, both of which (i.e., decreased cross-section and improved texture) are unexpected results over the prior art.

The fibers generally have an average equidiameter ranging from about 3 mm to about 4 mm, or about 3.1 mm to about 3.8 mm, or about 3.2 mm to about 3.6 mm, or about 3.3 mm to about 3.4 mm. In contrast, current vegan jerky products on the market have an equidiameter that is much higher, such as 4.2 to 4.5 mm (see Table 3).

The food product can be analyzed, by for example micro-CT to assess the circularity and aspect ratio of the fibers. The circularity of real beef jerky generally ranges from about 0.30 to about 0.55. Similarly, the circularity of the plant-based protein product of the present disclosure ranges from about 0.30 to about 0.50, from about 0.33 to about 0.45, such as about 0.34 to about 0.44, about 0.35 to about 0.43, about 0.360 to about 0.425. In some embodiments, the circularity of the present product ranges from about 0.34 to about 0.37, and at or about 0.33, 0.34, 0.35, 0.36, 0.37 or 0.38. In other embodiments, the circularity of the present product ranges from about 0.36 to about 0.43. In other embodiments, the circularity of the present product ranges from about 0.39 to about 0.45, and at or about 0.39, 0.40, 0.41, 0.425, 0.42, 0.43, 0.44 or 0.45. Current plant-based jerky products in the art comprise a circularity that is significantly lower, generally ranging from about 0.320 to about 0.354. The improved circularity of the present plant-based protein snack food product is similar to the texture of real meat, both of which (i.e., increased circularity and improved texture) are unexpected results over the prior art.

The aspect ratio of real beef jerky generally ranges from about 0.45 to about 0.55. Similarly, the aspect ratio of the plant-based protein product of the present disclosure ranges from about 0.42 to about 0.55, such as about 0.43 to about 0.54, about 0.45 to about 0.53, about 0.46 to about 0.52.

To assess certain organoleptic properties the plant protein snack with meat-like texture product was tested. One such test measures the fibrosity. The fibrosity of real beef jerky generally ranges from about 8.5 to about 10.5. Current plant-based jerky products in the art exhibit a fibrosity ranging from about 5 to about 7. However, the fibrosity of a plant-based protein snack food product of the present disclosure is at least 9 and may range from about 9 to about 15 or from about 10 to about 14, or about 11 to about 13, or about 12. The increased fibrosity of the present plant-based product over the known plant based products provides an improved texture to the resulting snack food product, both of which (i.e., increased fibrosity and improved texture) are unexpected results over the prior art.

Another test measures the pulling force, which seeks to mimic the pulling action when biting the meat jerky. The plant-based product exhibits a pulling force (gram-force or g force) that ranges from at least about 3500 to about 4500, about 4000 to about 5000, 4000 to about 5500, from about 5000 to about 7000 from about 5500 to about 6500, from about 6000 to about 6500, from about 6250 to about 6500, and from about 6300 g force. Current plant-based jerky products in the art comprise a "pulling force" that is significantly different. For example, domestic and international jerky products on the current market typically comprise a "pulling force" of about 1000 (i.e., 1040) and 9700 (i.e., 9734), respectively. In some instances, the pulling force of real beef jerky generally ranges from about 4300 to about 5400. The increased pulling force of the present plant-based protein snack food product is similar to the texture of real meat, both of which (i.e., increased pulling force and improved texture) are unexpected results over the prior art.

Methods of Making the Plant Protein Snack with Meat-Like Texture Product

The present disclosure is directed to methods of making and/or producing the plant-based protein product described above. More specifically, the methods of making and/or producing the plant-based protein product of the present disclosure comprise processes including, but not limited to preconditioning (e.g., to hydrate a dry mix), mixing, conveying, extruding, compressing, cooking, heating, shearing, cooling, tenderizing, marinating, and/or drying (see FIGS. 1-3). The present disclosure is also directed to a method of producing a meatless snack food product, such as a meatless jerky. Further, the present disclosure is directed to a method of producing a vegan snack food product, such as a vegan jerky.

Figure 3:
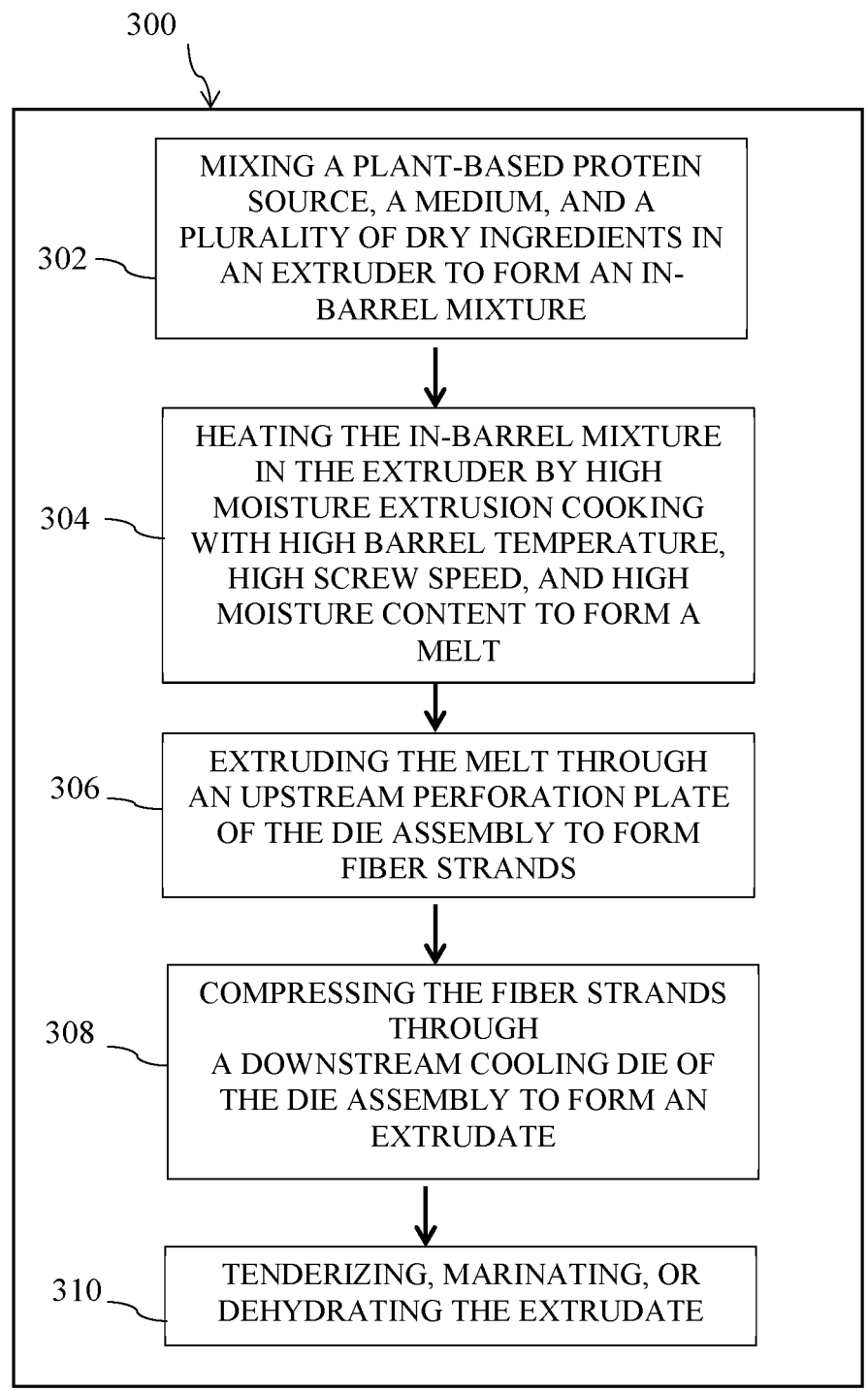
FIG. 3 is a flow chart depicting a third embodiment of the present methods of making and/or producing a plurality of plant-based protein snack food products of the present disclosure.
Figure 4:
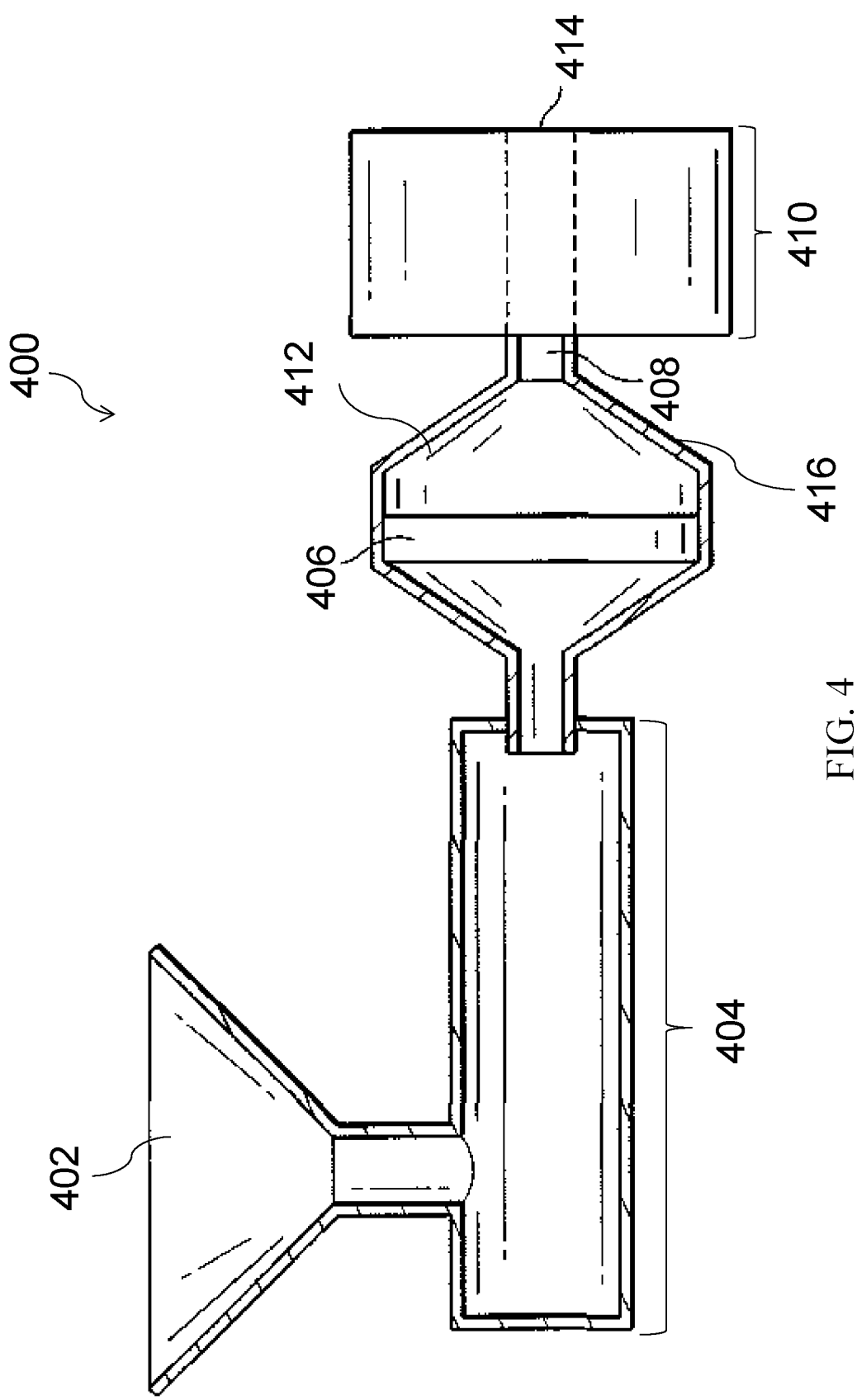
FIG. 4 is a schematic depicting a side view of an exemplary extruder apparatus used in making and/or producing the plant-based protein snack food product of the present disclosure.

The plant-based protein product of the present disclosure may be made and/or produced by introducing one or more protein sources, a plurality of dry ingredients, and a medium, along with any optional enhancer components (e.g., a flavoring agent) to an apparatus, an instrument, or an equipment, such as an extruding apparatus (see 400 of FIG. 4). An illustrative extruding apparatus (400) comprises an extruder portion or section (404 of FIG. 4) The one or more protein sources and the one or more dry ingredients may be added separately or as a combination or mixture to a hopper (402) of the extruder (404) where they are further combined and/or mixed together (see FIGS. 1-4).

Likewise, the medium and enhancers (e.g., flavoring and other agents) may be added to the extruder (404 of FIG. 4) separately, meaning at different times and/or via different feeder inlets, or simultaneously as a combination or a mixture. The medium, with or without the enhancers, may also be added to the extruder (404) simultaneously or after addition of the plurality of dry ingredients and the one or more protein sources to the extruder (404). A liquid medium (e.g., water or vinegar) may be warm or hot, such as by having a temperature ranging from about 18° F. to about 37.5° F. or greater, in order to aid dissolution and mixture of the dry ingredients. Once combined within the extruder (404), the dry ingredients, the protein source, and the medium form an in-barrel mixture (see FIGS. 1-4).

In an illustrative embodiment, the in-barrel mixture is heated by an extruder (404 of FIG. 4) via an extrusion cooking process (see FIGS. 1-4). An extrusion cooking process of the present disclosure is a thermomechanical process of manufacturing a snack food product or a plurality of snack food products. The extrusion cooking process of the present disclosure may comprise conveying, extruding, compressing, mixing, shearing, heating, melting, cooking, cooling, molding, and/or forming the in-barrel mixture to form a "melt" (see FIGS. 1-4).

Figure 2:
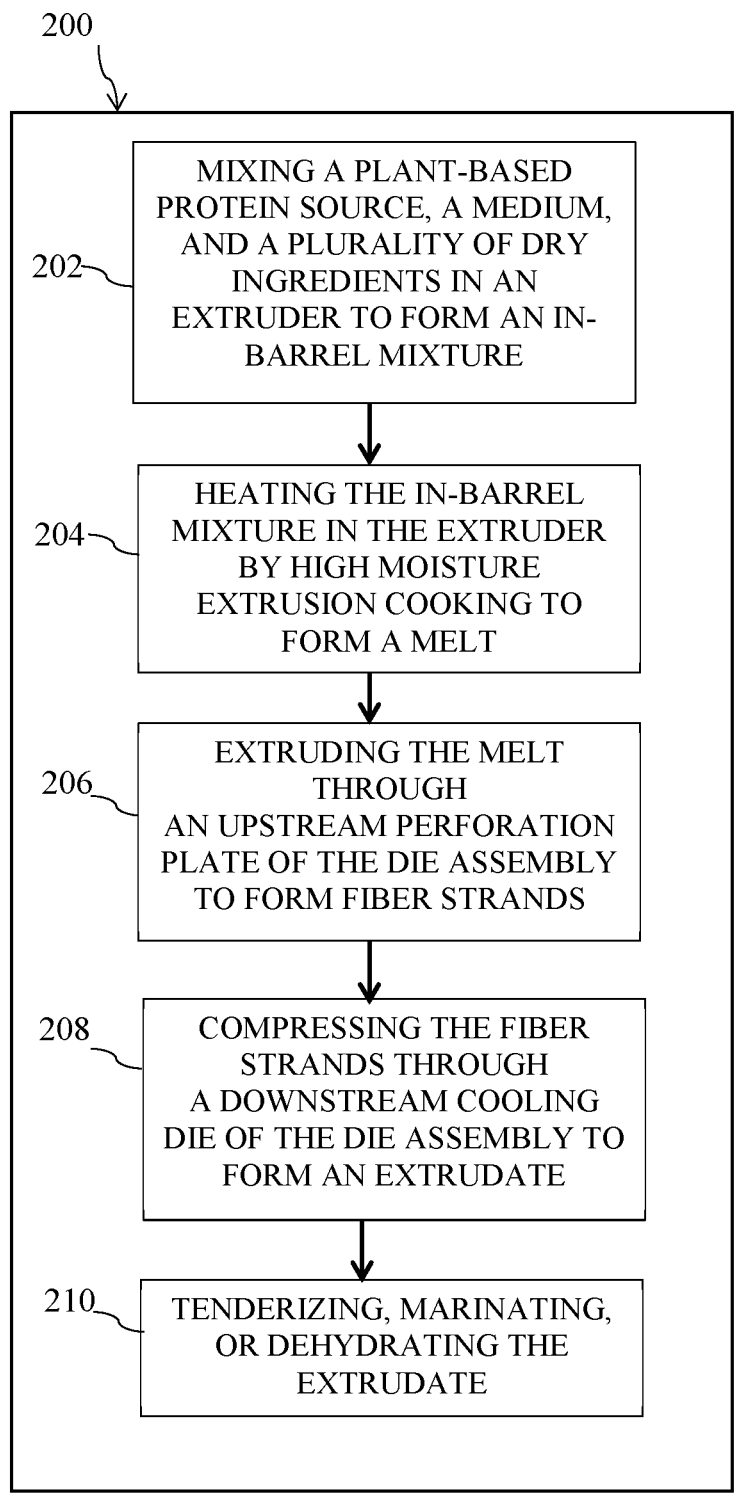
FIG. 2 is a flow chart depicting a second embodiment of the present methods of making and/or producing a plurality of plant-based protein snack food products of the present disclosure.

In an illustrative embodiment, the present methods comprise a high moisture extrusion cooking process (see FIGS. 1-3). The high moisture extrusion cooking process (HMEC) of the present disclosure may employ an extruder (404 of FIG. 4) to implement a unique combination of internal moisture conditions, barrel temperatures, screw rpm, feed rate, and screw profiles to the melt, which is further processed into the food product described herein having improved sensory, visual, and textural characteristics.

Referring to FIG. 4, the extruder (404) used in the methods of the present disclosure may comprise one or more components, including, but not limited to a hopper (402), an extruder, (404), a die assembly (412) a perforation plate (406), a cooling and/or forming die (408) a cooling barrel/zone (410), and an exit opening (414), inlets or feeders, shafts, barrels, and/or screws (not shown). In an illustrative embodiment, the extruder comprises at least one (1) or two (2) shafts. Each shaft of the extruder also comprises one or more screws. In an embodiment, the extruder may be a single-screw, dual-screw (e.g., twin-screw), or a multi-screw extruder.

Typically, each shaft of a multiple-screw extruder comprises at least one, and often more than one screw or screw element. A combination or plurality of multiple screw elements may be used to comprise a screw profile. Each screw is responsible for controlling how the in-barrel mixture is processed by compressing, mixing, shearing, conveying, and/or pumping the in-barrel mixture downstream (see FIGS. 1-4). In addition, the motor controls the speed of a gear box in which the screws rotate or turn (i.e., the screw speed) in revolutions per minute (rpm) to process the in-barrel mixture, as well as its dwell time within the extruder (404 of FIG. 4).

Typically, an operator may input and/or specify a particular screw speed or range of speeds (i.e., revolutions per minutes or rpms) using the Human Machine Interface (HMI) or Operator Interface Terminal (OIT). An operator will also manually select one or more screw elements and slide them onto the shaft based upon a predetermined "screw profile." Each of these screw segments or sections are put at a particular location on the shaft based on what extruder operation will be performed at that location. The screw speed impacts the rate at which materials, such as the in-barrel mixture or the melt, is fed into the extruder, conveyed, mixed, sheared, and/or or pumped out of the extruder (400/404).

The "work" or shear of the product is governed by many variables of the process, such as the screw speed, temperatures, feed rate, channel gaps/geometries, and others that affect material viscosity of the extrudate, such as formulation and moisture. The screw profile of the present methods typically comprises high screw rates or screw speeds that range from about 350 rpm to about 450 rpm. In an exemplary embodiment, the extruder operates at a screw speed of about 395 rpm. This screw profile provides a particular pattern or rhythm of processing the melt that positively affects the overall fiber texture of the resulting product (see 304 of FIG. 3). Thus, the screw profile is partly responsible for the conditions by which the present product is prepared, compressed, heated, mixed, sheared, conveyed, pumped, cooked, and cooled, which positively effects its textural, visual, and sensory attributes.

In addition to the screw profile of the present methods, water or moisture content within the extruder, barrel temperature, and product formula also have impact on the textural, visual, and sensory characteristics of the present product as there are significant interaction effects between these extrusion processing parameters. For example, pressure may build up within the extruder (404 of FIG. 4) as the product moves through it, such as from the hopper (402) or a different feeder or inlet to an outlet (414) of the cooling and/or forming die, cooling barrel, or cooling zone of the apparatus (400). In addition to the screw profile, the water content, the barrel temperature, and the pressure within the extruder are also very important to the viscoelastic properties of the in-barrel mixture (see 304 of FIG. 3), which becomes the melt during processing, and ultimately the present plant-based protein product.

More specifically, the moisture content of the in-barrel mixture of the present methods within the extruder (404/400 of FIG. 4) may range from about 40 wt % to about 65 wt %. For example, the moisture content of the in-barrel mixture may range may range from about 36 wt % to about 64 wt %, from about 36 wt % to about 61 wt %, from about 37 wt % to about 60 wt %, from about 38 wt % to about 59 wt, from about 39 wt % to about 58 wt, from about 40 wt % to about 55 wt %, and from about 40 wt % to about 60 wt %. The HMEC process of cooking the base composition also comprises a high moisture content, which is typically due to the addition of water into the extruder (see 304 of FIG. 3). For example, the moisture content in the extruder (404) during the HMEC process may range from about 40% to 65% moisture content, from about 45% to about 60%, from about 50% to about 65%, from about 55% to about 60%, and from about 50% to about 60%.

These high moisture conditions within the extruder (404) environment comprising the in-barrel mixture, are advantageous to the production of the plant-based snack food product as compared to other extrusion processes that comprise a lower moisture content, such as below 40 wt % moisture content and/or below 45 wt % moisture content (e.g., 30-35 wt % moisture content). Further, the high moisture content comprised within the extruder combined with other extruder (404) parameters, including the barrel temperatures and screw profiles during the cooking process of the melt (see FIGS. 1-3), work to produce the food products of the present disclosure that have advantageous sensory, visual, and textural qualities that were unexpectedly similar to or improved as compared to real meat products.

The extruder (400 of FIG. 4) may also comprise a heating zone or cooking zone that further comprise one or more barrels (not shown). These heating barrels or cooking barrels may be aligned in series in the heating zone of the extruder, and any heating and cooling profile may be employed. In an exemplary embodiment, the barrels may be set to gradually increase temperature from barrel to barrel. In other embodiments, the heating zone of the extruder (404) may comprise from about five (5) to about nine (9) cooking or heating barrels. In an exemplary embodiment, the heating zone comprises about six (6) heating barrels.

Within the extruder (404), the barrels slide over the top of the shafts and screws and control the temperature of the material (e.g., the melt). Heating and cooling barrels located in the heating zone (404) and the cooling zone (410), respectively, may regulate temperature by heating or cooling the melt. Barrel temperatures heat and/or cook the melt and also control that rate of cooking the melt while being blended by the screws of the extruder (404). Gaps between the screws and the barrels impact shear of the melt within the extrusion process.

Different and proper extruder configurations may comprise more or less barrels. The use of more barrels in the extruder will typically create an opportunity for longer extrudate dwell times within the extruder since more length for extrudate travel is enabled by the more barrels. Longer extrudate dwell time also creates the opportunity for a more gradual shear of the extrudate or holding of the extrudate at a specific shear rate for an elongated time period. The longer dwell time also allows for more thermal cooking, which is generally be provided by two methods: 1) viscous dissipation caused by shear or 2) particles moving against each other when heated (e.g., by heaters that impart heat to the extruder).

Similar to the screws, which are set to provide specific mixing speeds, the extruder barrels are programmed or set by an operator or user to have a specific temperature (i.e., a set point temperature). For example, during the extrusion and/or high moisture extrusion cooking (HMEC) process of the present methods (see FIGS. 2 and 3), the melt may be cooked in the heating barrels of the extruder (404 of FIG. 4) at a set point temperature of about 80° F. or higher. In some method embodiments, the set point temperature of the heating barrels to cook the melt may range from about 80° F. to about 350° F., from about 90° F. to about 345° F., and from about 100° F. to about 340° F., from about 110° F. to about 335° F., and from about 180° F. to about 320° F. In an illustrative embodiment, the set point temperature of the heating barrel during the extrusion process (e.g., HMEC) of the present methods ranges from about 80° F. to about 320° F. Accordingly, the barrels provide particular heating temperature profiles, such that when the melt is being mixed or sheared by the extruder screws at a particular speed, they are simultaneously being cooked at the set point temperature of the barrels (see FIGS. 1-3).

Notably, processing ingredients in the extruder (404 of FIG. 4) can generate heat as the particles are broken down via compression and screw rotation. This heat generation can be more than is desired to cook a melt into a specific snack food product. Therefore, the barrel set point temperatures may also be set to a temperature lower than the product cooking temperature inside the extruder (404). For example, the temperature of the extruder (404) may be set at a temperature of 300° F., which is technically cooling the product that is cooking inside the extruder barrel at a temperature of about 350° F. A user must take such considerations in mind when inputting the set point temperature for the heating and/or cooking barrels.

A dwell time of the current embodiment may range from about 60 seconds to about 120 seconds. Often, the dwell time of the melt ranges from about 80 seconds to about 120 seconds. This dwell time is the total time that the melt is in the extruder, including cooking, compressing, and cooling times. Dwell time within the extruder is also established via the combination of screw speed, feed rate, screw profile, and the number of heating and/or cooling barrels on the extruder. Processing of the melt with the specific settings of the shafts, screws, and barrels of the extruder helps create a desired texture and fibrosity of the present plant-based protein snack food product.

In an illustrative embodiment, the extruder (404) comprises a total of about four (4) to about sixteen (17) barrels, including both heating and cooling barrels. For example, the upstream extruder comprising a heating zone (404) of the apparatus (400) was previously described, and may comprise about five (5) to about eight (8) heating barrels (not shown). A downstream cooling zone (410) of the apparatus (400) may also comprise an additional one (1) to about nine (9) cooling barrels (not shown). In an illustrative embodiment, the extruder may comprise about six (6) heating barrels in the upstream heating zone (404), along with an additional six (6) cooling barrels that are located downstream in the cooling zone (410) for a total of twelve (12) barrels (see Table 2A). Additional key operational metrics of an exemplary extruder embodiment are also shown in Table 2B.

TABLE 2A

Exemplary Embodiment of Extruder Cooking Conditions

| Extruder Component | Approximate Temperature (° F.) |
|---|---|
| Cooking Barrel #1 | 113 |
| Cooking Barrel #2 | 194 |
| Cooking Barrel #3 | 280 |
| Cooking Barrel #4 | 298 |
| Cooking Barrel #5 | 298 |
| Cooking Barrel #6 | 298 |
| Forming Die Receptor Slit/Inlet | 297 |
| Cooling Barrels #1 to #6 | 135 to 160 |

TABLE 2B

Exemplary Extruder Operational Metrics

| Thrust (bar) | 24-34 |
|---|---|
| Power (kw) | 1 |
| Torque (lb-foot) | 5 |
| Amps | 19 |
| SME | 39.5 |

Importantly, in an exemplary embodiment, the cooling zone of the extruder of the present disclosure may also comprise about five (5) to about nine (9) cooling barrels. The large number of cooling barrels of the present extruder also provides advantages for the present plant-based protein snack product over product extruders comprising fewer cooling barrels (e.g., less than five (5) cooling barrels, such as none (0) or only one (1) cooling barrel).

The upstream heating and extruding zone (404) comprising heating barrels and the downstream cooling zone comprising cooling barrels, are separated by a transition zone (412). The transition zone (412) is a large area (e.g., about 2000 mm$^2$) of the apparatus (400) where the velocity of the melt typically slows upon exit from the extruder (404), except when being further extruded, such as through a die assembly (416). For example, in an illustrative embodiment of the present methods, the transition zone (412) comprises a die assembly (416).

Figure 5:
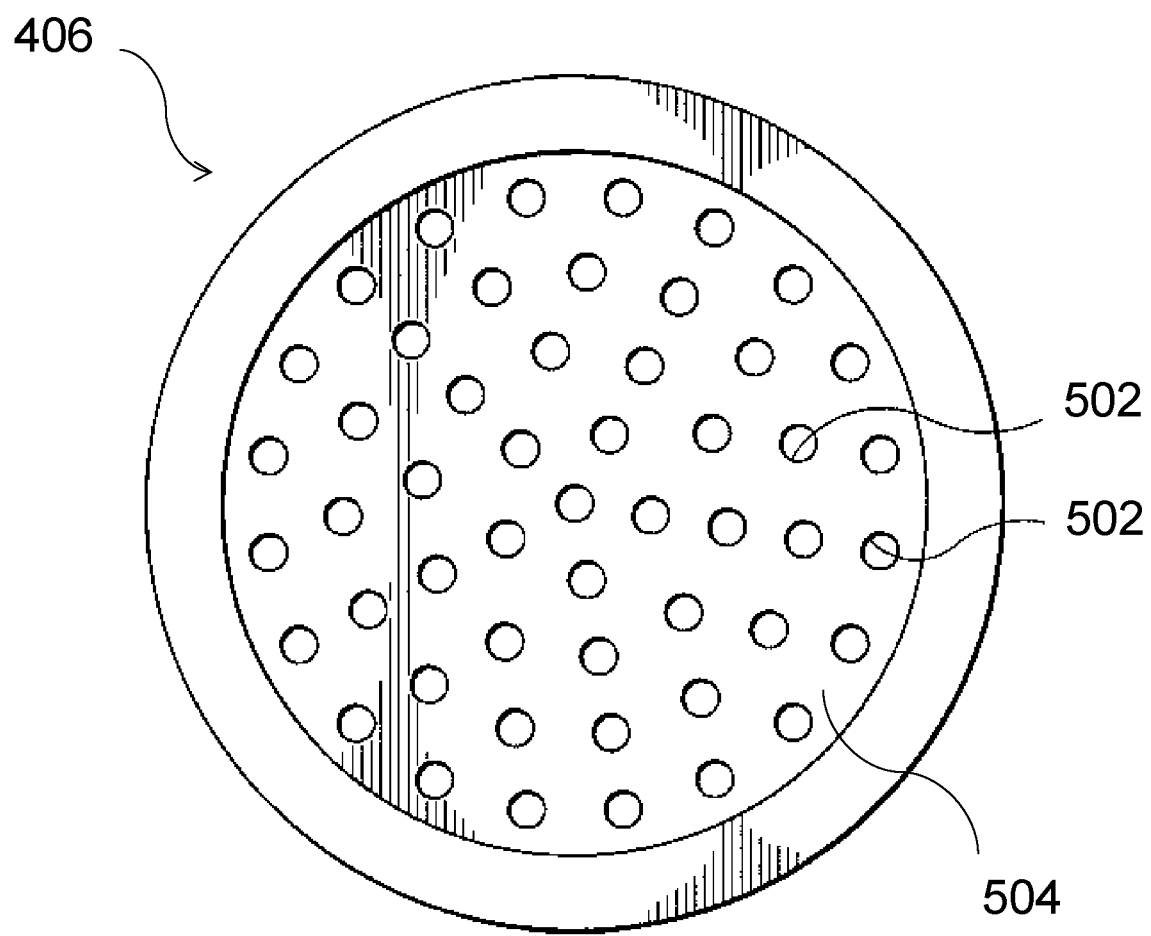
FIG. 5 is a schematic depicting an end view of one embodiment of a perforation plate of a die assembly of the extruder apparatus of FIG. 4.
Figure 6:
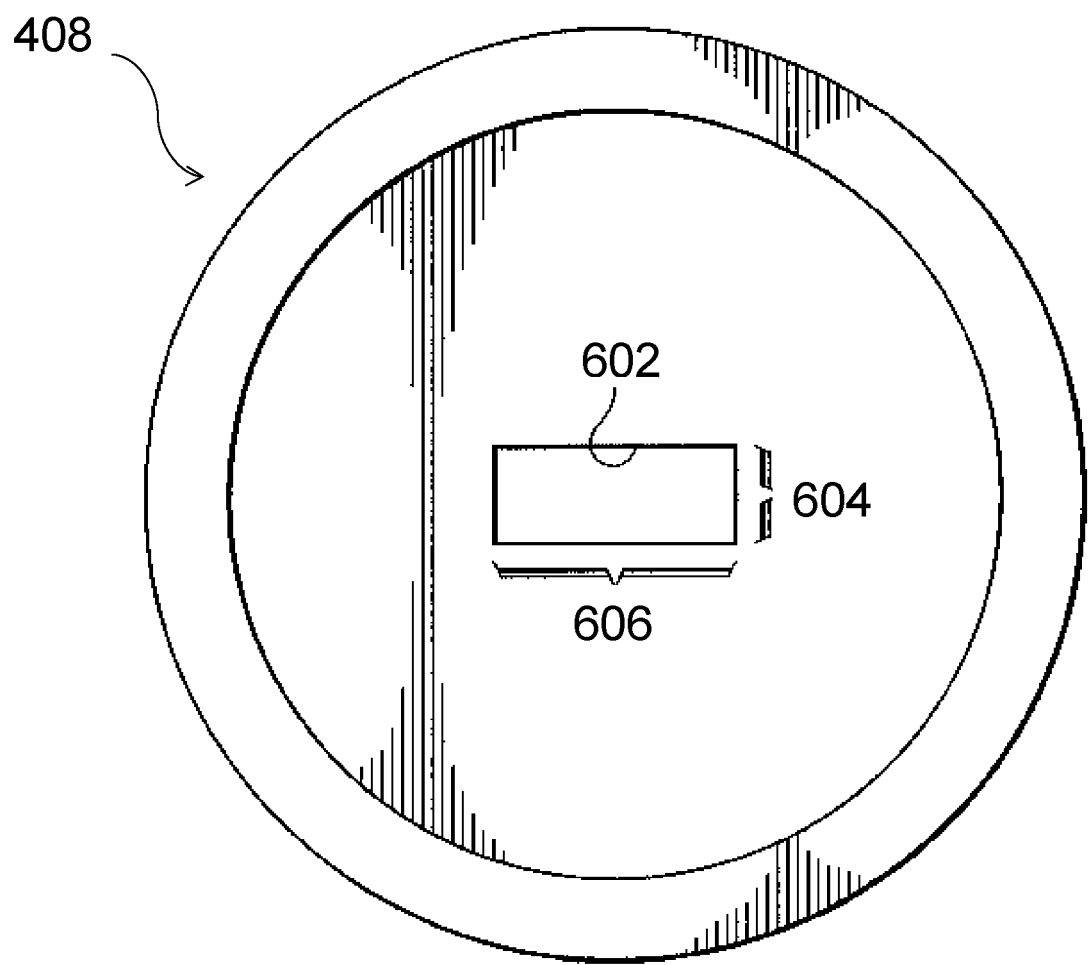
FIG. 6 is a schematic depicting an end view of one embodiment of a cooling and/or forming die of the die assembly on the extruder of FIG. 4.

An exemplary die assembly (416) of the present methods comprises an upstream perforation plate (406 of FIGS. 4 and 5) and a downstream cooling and/or forming die (408 of FIGS. 4 and 6). An illustrative perforation plate (406) of the present disclosure is a strand-forming plate (406). The perforation or strand-forming plate (406) may be made of any material, such as mesh and/or metal. Mesh for forming fibers using the perforation or strand-forming plate (406) may have different patterns comprised or cut into the plate that are transferred to the resulting fibers.

One embodiment of the perforation or strand-forming plate (406) of the present methods comprises a plurality of openings, holes, or perforations (502). The perforations are typically circular in shape and have a diameter that ranges from about 0.1 mm to about 1.9 mm, such as about 0.5 mm to about 1.9 mm, including, but not limited to about 0.1 mm, about 0.15 mm, about 0.25 mm, about 0.5 mm, about 1 mm, about 1.5 mm, about 1.6 mm, about 1.7 mm, about 1.8 mm, and about 1.9 mm. In a separate embodiment, the plurality of openings, holes, or perforations (502) have a diameter that ranges from about 2.0 mm to about 3.0 mm, such as about 2.5 mm to about 2.9 mm, including, but not limited to about 2.1 mm, about 2.2 mm, about 2.3 mm, about 2.4 mm, about 2.5 mm, about 2.6 mm, about 2.7 mm, about 2.8 mm, about 2.9 mm, and about 3.0 mm.

The perforation plate (406 of FIG. 5) is open to flow or compression of the melt through its openings or perforations (502). The percentage of the perforation plate (406) that is open for melt to flow through is a ratio of the perforation openings (502) to the overall surface area of the perforation plate (406). Typically, the perforation plate (406) of the present method has 50% or greater of its surface area (504) comprised by perforations (502). In some embodiments, the perforation plate (406) comprises only about 10% to about 20% of open area where holes (504) are comprised. Typically, about 19% to 80% of the area on the perforation plate (406) may comprise holes or openings (502) that are used to form strands of the melt.

The melt passes or flows through the plurality of perforations (502) of the perforation plate (406) to create multiple separate strands or "fiber strands." Thus, the number of perforations (502) in the perforation plate (406) corresponds to the number of melt strands that are produced after exiting the perforation plate (406). In other words, the greater number of perforations (502) in the perforation plate (406), the greater the number of strands of the product, the smaller the fiber strands, which corresponds to increased fibrosity of the melt, the extrudate, and the plant-based protein product. Therefore, after passing through the perforation plate (406), the melt strands are fibrous in texture (e.g., "fiber strands").

The fiber strands of the melt reconsolidate, upon entry into the downstream cooling and/or forming die ("cooling die") (408 of FIG. 6) through a single receptor slit (602). The receptor slit (602) of the cooling die (408) has a much smaller cross-sectional area than the multiple separate melt strands upon exit from the perforation plate (406). Thus, compression of the multiple melt strands onto each other via extrusion through the receptor slit (602) of the cooling die (408) creates strands These strands may be cross-linked. Cross-linking of the fiber strand is effected my several factors including the state of the materials, such as the degrees of cooking, level of shear, tackiness of the melt from gelatinization, choice of protein, content of protein, denaturing or denaturation of the protein(s), moisture, and others. This cross-linking enables multiple melt strands to stick together by aligning the proteins and starch chains in the melt to form a single plant-based protein product.

The receptor slit (602) of the cooling and/or forming die (408) may have any height dimensions (604) and width dimensions (606) useful in the art, including dimensions that subject the melt to size reduction. For example, in one embodiment, the receptor slit (602) of the cooling and/or forming die (408) is about 4 mm in height (604) by 500 mm in width (606). In another embodiment, the receptor slit (602) of the forming die is about 4 mm in height (604) by 50 mm in width (606). In one embodiment, the receptor slit (602) of the cooling die (408) comprises a height (604): width (606) ratio ranging from about 0.02 to about 0.16, 0.02 to about 0.08, or about 0.04 to about 0.16. While an exemplary embodiment of the receptor slit (602) of the cooling and/or forming die (408) is an elongated opening, such as in the form of an ellipse or a rectangle, the receptor slit (602) may have any shape including, but not limited to a square, an oval, a circle, a triangle, and any other shape. Further, the receptor slit (602) may be partitioned into a collection of smaller slits or openings having widths that total the height (604) and width (606) of the receptor slit (602).

As the extrudate passes through the perforation plate (406 of FIG. 4), "fibers" or "fiber strands" are created, and then are forced through the receptor slit where the fiber strands are compressed both horizontally and vertically and during which the fiber strands are cross-linked with each other to provide the resulting fibrous texture. Thereafter, the extrudate proceeds downstream to the cooling zone (410). Accordingly, the properties of the melt, which becomes the extrudate, will partially determine the amount of fibration, strength, and texture of the fibers and crosslinking of the resulting extrudate.

As previously described, the cooling zone (410) comprises cooling barrels (not shown) set to one or more cooling temperatures. In one embodiment, the cooling zone (410) and/or cooling barrels comprise a cooling temperature (i.e., a temperature less than the temperature of the melt exiting the forming die (408). In another embodiment, the cooling barrels may comprise a cooling temperature that assists to increase back pressure, help strengthen the cross-links, and/or solidify the fiber strands of the extrudate. In another embodiment, the cooling temperature may be less than the temperature of the melt, but not necessarily considered "cool."

Often, cooling of the extrudate in the cooling zones of the extruder comprises a "cooling water." An exemplary embodiment of "cooling water" of the present disclosure, or water used for cooling the extrudate that is below the temperature of the extrudate, has a temperature that ranges from about 130° F. to about 160° F.

The temperature of the cooling barrels may be the same or different, and will generally be about 200° F. or lower. In some method embodiments, the temperature of the cooling barrels may range from about 100° F. to about 200° F., from about 125° F. to about 175° F., from about 125° F. to about 155° F., and from about 120° F. to about 170° F., or about 110° F. to about 180° F. In an illustrative embodiment, the temperature of the cooling zone (410) comprising the cooling die (408) and/or the cooling barrels (410) of the present methods ranges from about 130° F. to about 160° F.

Upon exit of the cooling zone (414) via an opening (414), the extrudate will comprise a thickness, a width, and a length having a longitudinal axis along which the fibers are substantially aligned. The thickness and the width of the extrudate will substantially conform to the dimensions of the receptor slit (602 of FIG. 6) of the cooling die (408). However, the length of the extrudate may be further manipulated based on consumer desirability. For example, the extrudate may be divided and/or cut by the apparatus (400 of FIG. 4) or any conventional means in a "cross-machine" direction, which is perpendicular to the flow of the extrudate in the "machine-direction," to a provide a desired length.

The extrudate may then exit the cooling die (408) or a downstream opening (414) of the cooling zone (410). Upon exit into atmospheric pressure and/or ambient temperatures, the extrudate may expand, flash vapor, further cool, and rapidly firm and/or solidify. Accordingly, the present methods produce an extrudate that further comprises a fibrous, meat-like texture, which is unexpectedly improved over prior art products. The plant-based protein product of the present disclosure comprises the extrudate comprising the fibrous, meat-like texture.

Optionally, the extrudate may further undergo processes of seasoning, tenderizing, marinating, and/or drying (e.g., dehydrating) in order to produce the snack food product of the present disclosure. Any techniques and/or methodologies known in the arts to season, tenderize, marinate, and/or dry (e.g., dehydrate) the extrudate of the present disclosure may be used in the present methods. In addition, any instrument and/or equipment known in the arts to implement such additional processes, such as seasoning, tenderizing, marinating, and/or drying (e.g., dehydrating) the extrudate of the present disclosure, may be used in the present methods.

Depending on the size and shape of the cooling and/or forming die (408 of FIGS. 4 and 6), the extrudate produced by the methods described herein may be in various physical forms or shapes, including, but not limited to patties, links, mash, strips, balls, etc. but are generally in the form of jerky-type shape. The food products of the present disclosure are shelf stable and may be preserved, packaged, and/or presented in a variety of ways including, but not limited to fresh, frozen, canned, dried, freeze-dried, etc. An exemplary form of the plant-based protein snack food product produced by the present methods is a dried product, such as a dried jerky product (i.e., jerky).

An illustrative embodiment of the plant-based protein product of the present disclosure is a meatless snack food product. An illustrative embodiment of the meatless snack food product of the present disclosure is a meatless jerky. An illustrative embodiment of a meatless jerky of the present disclosure is a vegan jerky.

Notably, the present methods produce a plant-based protein product that has improved and/or increased sensory, visual, and/or textural features over prior art products. As noted previously, features and characteristics of the present plant-based protein product produced from the methods described herein may be measured using qualitative/descriptive (e.g., color, hardness, pull force, grind force, density, cohesiveness, chew uniformity, fibrosity between teeth, rough mass, fibrousness, etc.) and/or quantitative/analytical metrics (e.g., pulling force, fibrosity, cross-section, circularity, and/or aspect ratio). The analytical and/or structural features of the snack food products of the present disclosure may be assessed and/or observed by any technique and/or methodology used in the art.

Quantitative and/or analytical measurements of features of the macrostructure and/or microstructure of the plant-based protein product of the present disclosure may be observed by any research, experimental, diagnostic, and/or imaging methods and/or technologies. For example, any microscopic methodologies known in the biological arts for observing the microstructure (e.g., molecular and/or cellular structure) of a composition will also suffice for observing the microstructure of the present plant-based protein product. An illustrative technique and/or method useful for observing the microstructure (e.g., fiber size and diameter, circularity, aspect ratio, cross-section, pulling force, etc.) of the present product, includes but is not limited to a computed tomography (CT) scan.

Importantly, the qualitative/descriptive and quantitative/analytical measurements of the snack food product produced from the methods described herein have been demonstrated to be improved and/or increased over competitive prior art snack food products (i.e., "comparators") that are not produced from the methods described herein. As previously described, the present methods produce a plant-based protein product that has improved textural, visual, and/or sensory qualities and features over current and/or competitive products including, but not limited to fibrosity (e.g., fiber diameter/equidiameter), circularity, aspect ratio, pulling force, and/or fiber cross-section. The combination of these improved features comprised in the present plant-based protein product also provides an overall improvement in the textural, visual, and/or sensory profile of the snack food product of the present disclosure.

Independently and/or collectively, the improved features of the present plant-based protein snack food product (e.g., fibrosity, circularity, aspect ratio, cross-section, and/or pulling force) produced by the present methods result in superior qualities. The improved features are evidenced by analytical quantitative and qualitative descriptive data, provided herein. Thus, the present disclosure is directed to new and improved methods of making and/or producing the plant-based protein product of the present disclosure provide unexpectedly improved sensory, visual, and/or textural characteristics as compared to current and/or competitive methods and products known in the art. Such improved qualities, features, and/or characteristics of the present plant-based protein product are particularly important for the production of snack food products.

EXAMPLES

Illustrative embodiments of the compositions, components, and/or methods of the present disclosure are provided by way of examples. While the concepts and technology of the present disclosure are susceptible to broad application, various modifications, and alternative forms, specific embodiments will be described here in detail. It should be understood, however, that there is no intent to limit the concepts of the present disclosure to the particular forms disclosed, but on the contrary, the intention is to cover all modifications, equivalents, and alternatives consistent with the present disclosure and the appended claims. The following experiments were conducted to determine qualitative and/or quantitative effects of the steps of the present methodology, including ingredient and/or nutritional functionality of the plant-based protein composition of the present disclosure for use in snack food products, particularly snack food products for commercial retail.

Example 1: Quantitative/Analytical Features of the Plant-Based Protein Product Embodiments I and II A general embodiment of the plant-based protein product of the present disclosure is described as Plant-Based Protein Product Embodiment I in Table 1. An additional meatless (e.g., vegan) jerky product is further provided as the second embodiment of the plant-based protein product of the present disclosure (i.e., Embodiment II). Quantitative and/or analytical features and characteristics of Embodiment II are shown in Tables 3 and 4 below, and are representative of the features and characteristics of all embodiments of the claimed invention of the present disclosure. Additional details regarding quantitative and/or analytical features of Embodiments I and II are shown in FIGS. 7A and 7B.

Figure 7A:
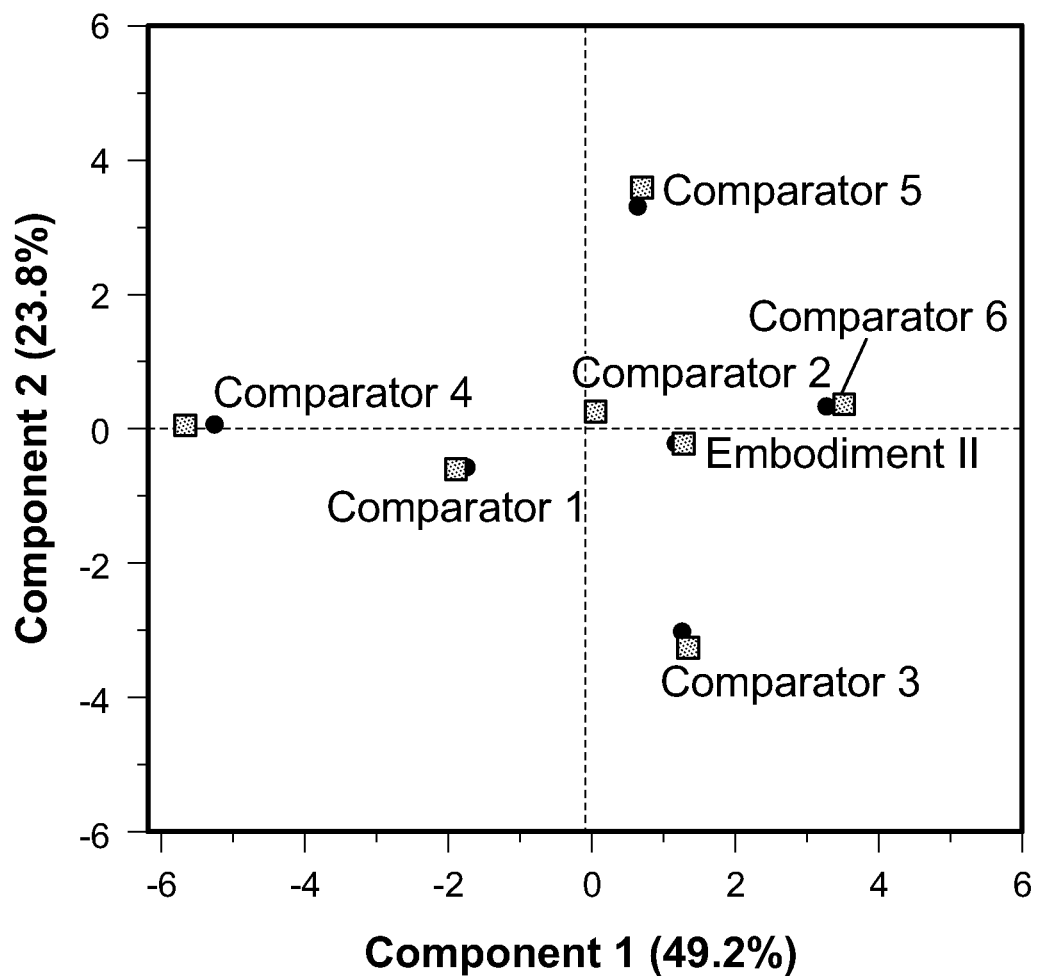
FIG. 7A is a graph showing the differences in a first principal component (Component 1) and a second principal component (Component 2) for a meatless jerky embodiment of the present plant-based products (i.e., Embodiment II) and six (6) comparators, including three (3) real meat jerky embodiments (i.e., Comparators 1-3) and three (3) vegan jerky embodiments (i.e., Comparators 4-6).
Figure 7B:
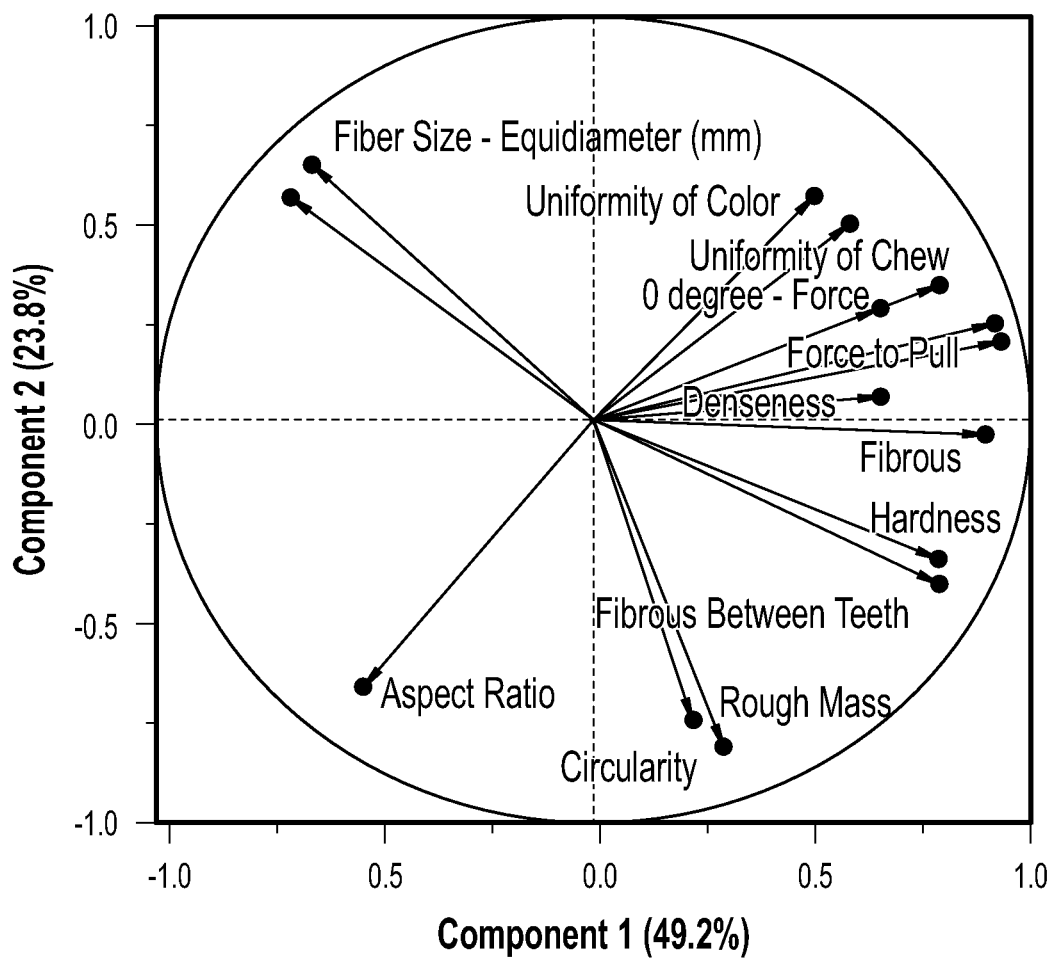
FIG. 7B is a diagram showing the differences a first principal component (Component 1) and a second principal component (Component 2) for several qualitative/descriptive (e.g., uniformity of color, uniformity of chew, degree of force, force to pull, density, fibrosity, hardness, fibrous between teeth, and rough mass) and/or quantitative/analytical (e.g., fiber size and equidiameter, circularity, aspect ratio, cross-section, pulling force) metrics for one embodiment (e.g., Embodiment II) of the meatless jerky snack product of the present disclosure.

Components 1 and 2 of FIGS. 7A and 7B are a first and a second principal component, respectively, that each reflect a linear combination of the texture attributes and analytical measurements shown in FIG. 7B (e.g., fiber size, uniformity of color or chew, force to pull, denseness, fibrous, hardness, rough mass, aspect ratio, circularity, etc.). A Principle Component Analysis (PCA) method was utilized to project the different samples into a two-dimensional plane. The percentages provided along the X- and Y-axes of FIGS. 7A and 7B indicate the percentage of variation in the data that is explained by that first and second respective principal component. For example, in FIGS. 7A and 7B, 49.2% of the total variation in the data is explained by the first principal component (i.e., Component 1). Similarly, 23.8% of the total variation in the data is explained by the second principal component (i.e., Component 2).

Ultimately, the closer the two samples are in FIGS. 7A and 7B, the more attributes they have in common. For example, meatless/vegan jerky product Embodiment II was compared to six (6) different comparator/competitor products. Comparator 1 (i.e., Chef's cut handcrafted beef jerky), Comparator 2 (i.e., Jack's Links beef jerky), Comparator 3 (i.e., Homegrown Paleo beef jerky), Comparator 4 (i.e., Louisville-domestic vegan jerky), and Comparator 5 (Sumama-international vegan jerky) are all domestic or international competitor products in the meat and/or meatless jerky commercial market (see FIG. 7A). Comparator 6 is a meatless/vegan jerky product embodiment currently available on the market that was prepared in house. FIG. 7A demonstrates that the claimed meatless/vegan jerky product Embodiment II was most similar to Comparator 2 (i.e., Jack's Links beef jerky).

FIG. 7B demonstrates that quantitative/analytical features of Embodiment II were observed and/or measured, and further compared to the same features measured for competitor real meat products (i.e., Comparators 1-3) and meatless/vegan comparative products (i.e., Comparators 4-6). Notably, when two attributes form a close to zero degree (0°) angle in FIB. 7B, such as between Circularity and Rough Mass or Hardness and Fibrous Between Teeth, this indicates that the two attributes have a high positive correlation. A close to ninety degree (90°) angle, such as between Fiber Size and Aspect Ratio, indicates the two attributes do not have much correlation. While a close to 180° angle, such as between Uniformity of Color and Aspect Ratio, indicates the two attributes have a high negative correlation.

More specifically, the pulling force (as determined by the TAXT2 process) of Embodiment II was measured to be 6318 g force. This pulling force value was significantly higher than the average 9252 g force of pulling of the meatless/vegan jerky comparators 4-6, including the domestic vegan jerky comparator (i.e., 1040), the international vegan jerky comparator (i.e., 9734), and the in-house vegan jerky comparator (i.e., 16983). Notably, the pulling force of Embodiment II was also significantly increased from the pulling force of the three real meat (i.e., beef jerky) comparators 1-3, which had an average pulling force of about 4895 including pulling forces of 4389, 5369, and 4929 g force, respectively (see Table 3). This increased pulling force of the plant-based protein product of the present disclosure independently, collectively, and unexpectedly contributes to the improved texture of the claimed vegan jerky products, such as Embodiments I and II.

In addition, the fiber size of Embodiment II was determined by measuring the cross-sectional area and diameter (equidiameter) of the fibers (see Table 3). The cross-sectional area of the fibers of product Embodiment II was 7.39 $mm^2$. The average fiber cross-sectional area for the three beef jerky comparators 1-3 was about 9.54 $mm^2$, including cross-sectional areas of 9.02 $mm^2$, 11.77 $mm^2$, and 7.83 $mm^2$, respectively (see Table 3). The average cross-sectional area for the three vegan jerky comparators was about 12.92 $mm^2$, including domestic vegan jerky comparator 4 (i.e., 16.24 $mm^2$), international vegan jerky comparator 5 (i.e., 14.47 $mm^2$), and in-house vegan jerky comparator 6 (i.e., 8.04 $mm^2$; see Table 3). Thus, the cross-sectional area of the fibers of Embodiment II (i.e., 7.39 $mm^2$) was reduced compared to the average cross-sectional area of both the real beef jerky comparators 1-3 (i.e., 9.54 $mm^2$) and the vegan jerky comparators 4-6 (i.e., 12.92 $mm^2$). This reduced cross-sectional area of the fibers of the plant-based protein product of the present disclosure independently, collectively, and unexpectedly contributes to the improved texture of the present meatless jerky product (e.g., Embodiments I and II).

The equidiameter of the fibers of Embodiment II was 3.21 mm. The average fiber equidiameter for the three beef jerky comparators 1-3 was about 3.37 mm, including equidiameters of 3.31 mm, 3.73 mm, and 3.08 mm, respectively (see Table 3). The average fiber equidiameter for the vegan jerky comparators 4-6 was about 4.01 mm, including the domestic vegan jerky comparator 4 (i.e., 4.48 mm), the international vegan jerky comparator 5 (i.e., 4.24 mm), and the in-house vegan jerky comparator 6 (i.e., 3.32 mm; see Table 3). Thus, the equidiameter of the fibers of product Embodiment II was less than, but comparable to the average fiber equidiameter of the real beef jerky comparators (i.e., 3.37 mm), and was substantially reduced from the 4.01 mm average equidiameter observed for the vegan jerky comparators (see Table 3). The 3.32 mm fiber equidiameter of the plant-based protein product of the present disclosure, which is comparable to the fiber equidiameter of real beef jerky (i.e., 3.37 mm), independently, collectively, and unexpectedly contributes to the improved texture of the present meatless jerky products, such Embodiments I and II.

The microstructure of the fibers of Embodiment II was also analyzed by micro-CT to assess the circularity and aspect ratio. The aspect ratio of Embodiment II was 0.513. The average aspect ratio for the three beef jerky comparators 1-3 was about 0.516, including aspect ratios of 0.537, 0.488, and 0.523, respectively (see Table 3). The average aspect ratio for the three vegan jerky comparators was about 0.484, including domestic vegan jerky comparator 4 (i.e., 0.516), international vegan jerky comparator 5 (i.e., 0.471), and in-house vegan jerky comparator 6 (i.e., 0.464; see Table 3). Thus, the aspect ratio of the fibers of Embodiment II (i.e., 0.513) was less than, but comparable to the average aspect ratio of the beef jerky comparators 1-3 (i.e., 0.516) but higher than the average aspect ratio of the three vegan jerky comparators 4-6 (i.e., 0.484; see Table 3). This aspect ratio feature of the plant-based protein product of the present disclosure independently, collectively, and unexpectedly contributes to the improved texture of the present meatless jerky products, such as Embodiments I and II.

Finally, the circularity of Embodiment II was 0.422. The average circularity for the three beef jerky comparators 1-3 was about 0.405, including circularities of 0.339, 0.367, and 0.508, respectively (see Table 3). The average circularity for the vegan jerky comparators 4-6 was about 0.345, including the domestic vegan jerky comparator 4 (i.e., 0.354), the international vegan jerky comparator 5 (i.e., 0.320), and the in-house vegan jerky comparator 6 (i.e., 0.360; see Table 3). Thus, the circularity of the fibers of Embodiment II (i.e., 0.422) was greater than, but comparable to the average circularity of the real beef jerky comparators 1-3 (i.e., 0.405) and significantly increased over the average circularity of the vegan jerky comparators 4-6 (i.e., 0.345; see Table 3). This increased circularity feature of the plant-based protein product of the present disclosure independently, collectively, and unexpectedly contributes to the improved texture of the present meatless jerky products, Embodiments I and II.

Example 2: Qualitative/Descriptive Features of Plant-Based Protein Product Embodiments I and II Meatless (e.g., vegan) jerky product Embodiment II is again provided comprising the plant-based protein product of the present disclosure. One or more trade panels and/or surveys were implemented to solicit and collect the descriptive and/or qualitative data and information regarding the present plant-based protein product embodiments from product consumers and/or trade experts. The qualitative and/or descriptive data was collected, compiled, and/or curated for further analysis of the present plant-based protein product embodiments (i.e., Embodiments I and II).

More specifically, qualitative and/or descriptive features and characteristics obtained via the trade and/or consumer panels regarding Embodiment II, as well as Comparators 1-6 (described in Example 1 above), are shown below in Table 4. In particular, the following qualitative measures were obtained and/or accessed for Embodiment II, as well as Comparators 1-6: color, hardness, pull force, grind force, density, cohesiveness, chew uniformity, fibrosity between teeth, rough mass, fibrousness, etc. Additional details regarding qualitative and/or descriptive features of Embodiment II are shown in FIGS. 7A and 7B.

Overall, the qualitative features of Embodiment II are comparable to the real meat jerky comparators (i.e., Comparators 1-3) and the vegan jerky comparators (i.e., Comparators 4-6; see Table 4). Typically, the domestic vegan jerky (i.e., Comparator 4) provided significantly different qualitative measurements when compared to the real beef jerky (i.e., Comparators 1-3), the international vegan jerky (i.e., Comparator 5), or Embodiment II. Accordingly, as demonstrated in Table 4, the qualitative features of Embodiment II are comparable to the real meat and meatless competitive products, according to a trade and/or consumer panel. Thus, the plant-based protein product of the present disclosure independently, collectively, and unexpectedly contributes to the improved texture of the present meatless jerky products, such as Embodiments I and II, and others.

The preceding description enables others skilled in the art to use the technology in various embodiments and with various modifications as are suited to the particular use contemplated. In accordance with the provisions of the patent statutes, the principles and modes of operation of this disclosure have been explained and illustrated in exemplary embodiments. Accordingly, the present invention is not limited to the particular described and/or exemplified embodiments.

While the concepts of the present disclosure are susceptible to various modifications and alternative forms, specific exemplary embodiments of the disclosure have been shown by way of example in the drawings. It should be understood, however, that there is no intent to limit the concepts of the present disclosure to the particular disclosed forms; the intention is to cover all modifications, equivalents, and alternatives falling within the spirit and scope of the invention as defined by the claims.

TABLE 3

Analytical Metrics of Plant-Based Protein Composition Embodiments

| Plant-Based Protein Embodiment II compared to Prior Art Comparators/Competitors 1-6 | | Analytical - Texture - TA.XT2 | Morphometric and color measurements | | Analytical - Microstructure - Micro-CT | |
| --- | --- | --- | --- | --- | --- | --- |
| | | | Fiber Size - Cross-section area | Fiber Size - Equidiameter | | |
| Sample | Sample Type | Force | (mm$^2$) | (mm) | Aspect Ratio | Circularity |
| Embodiment II | Meatless/Vegan Jerky | 6318 | 7.39 | 3.21 | 0.513 | 0.422 |
| Comparator 1 | Beef Jerky | 4389 | 9.02 | 3.31 | 0.537 | 0.339 |
| Comparator 2 | Beef Jerky | 5369 | 11.77 | 3.73 | 0.488 | 0.367 |
| Comparator 3 | Beef Jerky | 4929 | 7.83 | 3.08 | 0.523 | 0.508 |
| Comparator 4 | Domestic Vegan Jerky | 1040 | 16.24 | 4.48 | 0.516 | 0.354 |
| Comparator 5 | International Vegan Jerky | 9734 | 14.47 | 4.24 | 0.471 | 0.320 |
| Comparator 6 | In-House Meatless/Vegan Jerky | 16983 | 8.04 | 3.32 | 0.464 | 0.360 |

TABLE 4

Qualitative/Descriptive Metrics of Plant-Based Protein Composition Embodiment II and Comparators

| Plant-Based Protein Embodiment II compared to Prior Art Comparators/Competitors 1-6 | | Descriptive Panel - Appearance Descriptive Panel - Appearance Uniformity of Color | Descriptive Panel - Texture | | | | | | | | |
|---|---|---|---|---|---|---|---|---|---|---|---|
| | | | First Chew | | | | | | Fibrous Between Teeth | Chewdown | |
| Sample | Sample Type | | Hardness | Force to Pull | Force to Grind | Denseness | Cohesiveness | Uniformity of Chew | | Rough Mass | Fibrous |
| Embodiment II | Meatless/Vegan Jerky | 12 | 9 | 13 | 11 | 11 | 11 | 11 | 12 | 6.5 | 6.5 |
| Comparator 1 | Beef Jerky | 10.5 | 9 | 8 | 7 | 12 | 6.5 | 11 | 8.5 | 7 | 4 |
| Comparator 2 | Beef Jerky | 9 | 10 | 13.5 | 8 | 13 | 8 | 11.5 | 9 | 7.5 | 5 |
| Comparator 3 | Beef Jerky | 7 | 11.3 | 12.5 | 10 | 13 | 9.8 | 11 | 10.5 | 8.5 | 5 |
| Comparator 4 | Domestic Vegan Jerky | 6 | 8 | 5 | 4 | 10 | 8 | 10 | 6 | 7 | 2.5 |
| Comparator 5 | International Vegan Jerky | 12 | 9.5 | 14 | 12 | 13 | 11 | 12 | 7 | 6.5 | 4.5 |
| Comparator 6 | In-House Meatless/Vegan Jerky | 10 | 11 | 15 | 12.5 | 12.5 | 10.5 | 11 | 12 | 7.5 | 7.5 |

The following terms are described to assist one of skill in the art to understand the above description and the claims.

The terms "about" and/or "approximately," as used herein, refer to a specified value, measurement, feature, and/or characteristic of the claimed method and/or product plus or minus 15, 10, 5, 4, 3, 2, 1, or 0.5% of the specified value, measurement, feature, and/or characteristic.

The phrase "and/or" refers to the inclusion of several embodiments described or implied in the present disclosure comprising one of the described components, compositions, agents, products, or steps of the embodiment; all of the components, compositions, agents, products, or steps of the embodiment; or a combination of one or more of the components, compositions, agents, products, or steps of the embodiment of the invention of the present disclosure.

The phrase "aspect ratio" or "AR" refers to an analytical measurement of a geometrical shape of the individual fibers comprising the finished plant protein snack with meat-like texture product. Typically, the aspect ratio of a shape comprises the ratio of the sizes of the different dimensions of that shape. In the present disclosure, the aspect ratio of the present disclosure describes the ratio of the smallest diameter to the largest diameter of an oblong shape. Both diameters are orthogonal to each other. AR values vary from zero for a line to 1 for a circle. AR describes the degree of elongatedness or roundness of two-dimensional shapes.

The term "circularity" or "circular," refers to an analytical measure of the shape of the individual fibers comprising the finished plant protein snack with meat-like texture product. Circularity is defined as the ratio of 4*pi*Area (A) to Perimeter (P) squared (4*pi*A/P^2) of a two-dimensional shape. In addition, circularity describes the degree of jaggedness of the shape. Circularity of a shape may vary from 1 for a circle to a value much smaller than 1 for a highly jagged or irregular shape, such as a starfish. In addition, a component or composition that has a circularity of 0.36 is further from being in the shape of a perfect circle than a component or composition that has a circularity of 0.68 while being closer to being a perfect circle than a composition or component that has a circularity of 0.24.

The "aspect ratio" and "circularity" may be measured, analyzed, and/or observed with known techniques, methodologies, and equipment used in the art including, but not limited to computed tomography (CT) and/or micro-computed tomography (μCT), also called micro-CT. The aspect ratio and circularity are hedonic measurements that have no units, but are relative to one another.

The terms "component," "components," "composition," or "compositions" refer to a constituent part of a product, such as a snack food product, of the present disclosure. For example, components or compositions of a product of the present disclosure can include one or more ingredients (e.g., a snack food ingredient), and/or any other agent present in the product. Additional components and compositions of the snack food product of the present disclosure may include, but are not limited to, flavorings, adjuvants, excipients, dispersants, emulsifiers, additives, etc. Features and characteristics of the present composition or component may be measured using qualitative/descriptive (e.g., pulling force) and/or quantitative/analytical metrics (e.g., cross-section, circularity, and/or aspect ratio).

Where an embodiment of the method, system, and/or product of the present disclosure is described herein as "comprising" some composition, compound, formulation, product, processes, and/or method steps, additional embodiments may "consist essentially of" or "consist of" the same composition, compound, formulation, product, processes, and/or method steps. Although the term "comprising" is generally used herein to describe the present methods of making and/or producing the plant-based protein product, or the product itself, it is understood that additional embodiments are encompassed that may be described by substituting the term "comprising" with "consisting essentially of" or "consisting of."

As used herein, the phrase "cross-section" refers to a structural feature or characteristic of the plant-based protein composition of the present disclosure. As known in the art and used herein, the phrase "cross-section" refers to an analytical measure of the area of the composition exposed by making a straight cut through the composition. In an illustrative embodiment, the "cross-section" may include, but is not limited to a vertical cross-section, a horizontal cross-section, and/or a diagonal cross-section of the one or more fibers comprised by the plant-based protein composition or a snack food product. An illustrative embodiment of the "cross-section" of the present disclosure refers to the vertical cross-section of the one or more fibers comprised by the plant-based protein composition. The fiber cross-section of the present disclosure is typically measured by squared millimeters ($mm^2$).

The "extruder" of the present disclosure may be described by the relative position or location of features or components of the apparatus that are used in the present methods. For example, the terms "upstream" and "downstream" may be used to describe the location of components or products relative to a process path from the feed section of the extruder to the exit from the die. Illustrative embodiments of the extruder apparatus disclosed herein can include a process path of raw materials (e.g., dry ingredients) upon entering the extruder through an upstream hopper end, followed by one or more or several sequentially numbered barrels, through a perforation plate, then finally exiting downstream from the extruder through a cooling and/or forming die. Accordingly, the perforation plate of an embodiment of the extruder may be described as "downstream" from the hopper, but upstream from the cooling and/or forming die.

The term "extrudate" refers to a composition that exits the cooling die and/or forming die of the extruder into the atmospheric environment as a product. Alternatively, the "extrudate" may exit the cooling and/or forming die as the product before entering and exiting an optional cooling barrel. Further, the "extrudate" may serve as an intermediate product of the present disclosure that exits the extruding process via the cooling and/or forming die before being further processed by one or more additional methods, such as seasoning, tenderizing, marinating, and/or drying.

The terms "fiber," "fibers," or "fiber strands" refer to the one or more (i.e., a plurality) strands of the melt that are overlaid upon and/or atop one another and may be cross-linked with each other both in a vertical direction or a horizontal direction and are generally or substantially aligned along the longitudinal axis (i.e., the flow direction) to provide the overall meat-like texture of the plant protein snack with meat-like texture product. The fibers of the composition may comprise an area and a equidiameter that may be measured, analyzed, and/or observed by methods, techniques, instruments, and/or equipment known in the art. The quantitative/analytical and qualitative/descriptive features and/or characteristics of the fibers independently and collectively contribute to the improved texture of the plant-based protein snack food product of the present disclosure.

The terms "fibrosity" or "fibrousness" refer to one or more structural features or characteristics that influence the texture of the plant-based protein product of the present disclosure. More specifically, the "fibrosity" or "fibrousness" refers to a hedonic measure of the texture of the product, including the strands, which may further comprise fiber size and diameter (e.g., equidiameter). More specifically, the "fibrosity" or "fibrousness" of the plant-based product of the present disclosure refers to one or more measures of the texture of the product. For example, the fibrosity of the product may comprise certain sensory features that contribute to the texture of the product, including, but not limited to Force to Pull, Force to Grind, Fibrous Between Teeth, Roughness of Mass, etc. (see Table 4 and/or FIG. 7B). These features of the present product may be compared to one or more embodiments of real beef jerky. An exemplary embodiment of the plant-based product of the present disclosure comprises a "fibrosity" or "fibrousness" that is equal to and/or greater than the fibrosity of real beef jerky. For example, fibrosity or fibrousness of the present plant-based protein snack product may be defined as the sensory perception of the product as having filaments, strands, muscle tissue, and/or plant fibers.

The phrases "hedonic measurement" or "hedonic index" are qualitative metrics that capture, categorize, convey, and/or measure judgments of likes/dislikes, pleasure/displeasure, and preferences obtained in response to compositions and/or products. Adopted in the food and beverage industry as a measure of acceptability of food and/or beverage products, an illustrative embodiment of the hedonic measurement utilized in the present disclosure may comprise any numeric scale (e.g., a 9-point scale). Typically, a hedonic measure is a qualitative and/or numeric metric that is unitless. Thus, hedonic measurements may be applied to consumer judgments regarding commercial compositions or products in the research, development, and or marketing phase. For example, hedonic measurements may be utilized to measure sensory characteristics of commercial products, such as the snack food products of the present disclosure.

The qualitative and/or descriptive metrics of the plant-based protein product may be obtained by using panels and/or surveys executed by food trade experts and/or novice consumers that have no, limited, and/or broad food product and/or industry expertise. Illustrative qualitative or descriptive metrics that may be obtained from an industry panel includes, but are not limited to color, taste, texture, feel, hardness, pull force, grind force, density, cohesiveness, chew uniformity, fibrosity between teeth, rough mass, fibrousness, etc.

A third-party entity that independently implements trade panels and/or surveys to solicit and collect descriptive and/or qualitative data and information from product consumers and trade experts may be utilized in the present methods. An illustrative example of such a third-party entity is Sensory Spectrum (www.sensoryspectrum.com), whose expertise may have been utilized to collect the qualitative and/or descriptive data for the snack food products prepared by the methods of the present disclosure.

The phrase "in-barrel mixture" refers to the contents of an extruder once the dry ingredients comprising a plant-based protein source, along with a medium (e.g., water or vinegar) are added. Additional enhancer components, such as flavoring, may also be added to the "in-barrel mixture." For example, once all of the ingredients are added to the extruder, and are present in a predetermined composition, the contents of the extruder are considered an "in-barrel mixture."

In the present disclosure the term "meat" refers to the edible flesh portions of an animal that are eaten as food by human and/or other animals. The term "meat" of the present disclosure comprises any and all animals including, but are not limited to cows, pigs, chicken, deer, bison, buffalo, duck, seafood, shellfish, fish, lamb, sheep, goat, etc. While plant-based products are generally meatless, meatless products do not have to be plant-based. However, as used in the present disclosure, the terms "plant-based" and "meatless" may be synonymous and thus, interchangeable.

The term "melt" refers to the composition that results when the "in-barrel mixture" is heated, cooked, and/or converted into a molten state. For example, the melt is formed within the extruder and may then be passed into a die assembly comprising a cooling and/or forming die before exiting the cooling and/or forming die of the extruder to produce the present plant-based protein product.

"Optional" or "optionally" refers to a circumstance in which the subsequently described event or circumstance may or may not occur, and the description includes instances where the event or circumstance occurs and instances in which it does not. "Optionally" is inclusive of embodiments in which the described condition(s) are present and embodiments in which the described condition(s) are not present.

The term "plurality" refers to a number or amount of components, agents, and/or compositions of the present disclosure. Generally, a "plurality" refers to more than one, numerous, and/or multiple components, agents, and/or compositions of the present disclosure and may range up to an infinite, unlimited, and/or unquantifiable number of the same components, agents, and/or compositions. For example, a "plurality" may refer to two or more or even three or more components, agents, and/or compositions and may range up to an infinite, unlimited, and/or unquantifiable number of the same components, agents, and/or compositions. Typically, the number or amount of the plurality of the components, agents, and/or compositions, in and of itself, does not have significant consequence or effect on outcomes.

The phrase "pulling force," as described in the present disclosure, refers to the amount of force that is required to pull apart, break, or separate the plant-based protein product into two or more pieces, portions, or parts. An illustrative embodiment of pulling force in the food industry relates to the amount of tension required for a consumer to pull apart a composition or a product into two or more pieces (e.g., pull force). Another embodiment of pulling force of the present disclosure relates to the amount of force required for a consumer to bite a composition or a product into two or more pieces (e.g. chew force or grind force).

The "pulling force" of the present composition may be determined by tensile testing implemented by a Texture Analyzer, using a TXP2 or TXT2 instrument and/or method as known and understood in the arts. More specifically, a 2×2 inch sample of the present product was held by the Tensile Rig of the instrument and subjected to controlled tension until failure. Product samples were tested such that fibers were vertical (0°) and horizontal (90°) orientations. The maximum tensile strength or force used for both directions determines the pulling force, measured in units of "gram-force" or "g force."

The invention claimed is:

1. A plant-based protein snack food product comprising:
   a strand formed from a plurality of substantially aligned fiber strands overlaid atop one another and at least some fiber strands cross-linked in a vertical direction and a horizontal direction,
   wherein a cross-sectional area of each of the fiber strands ranges from about 6 mm² to about 8.5 mm²,
   wherein the plurality of fiber strands include one or more plant protein sources and one or more dry ingredients, and
   wherein the product exhibits a pulling force ranging from about 4,500 to about 7,000 gram-force.

2. The plant-based protein snack food product of claim 1, wherein the product does not comprise a leavening agent.

3. The plant-based protein snack food product of claim 1, comprising about 1 wt. % to about 99 wt. % of the one or more dry ingredients.

4. The plant-based protein snack food product of claim 3, wherein the one or more dry ingredients includes flavorants, colorants, and acidulants.

5. The plant-based protein snack food product of claim 1, further comprising a fiber strand circularity ranging from about 0.3 to about 0.55.

6. The plant-based protein snack food product of claim 1, further comprising a fiber strand equidiameter in the range of about 3 mm to about 4 mm.

7. The plant-based protein snack food product of claim 1, further comprising an aspect ratio in the range of about 0.4 to about 0.6.

8. The plant-based protein snack food product of claim 1, comprising about 35 wt. % to about 90 wt. % of the one or more plant protein sources.

9. The plant-based protein snack food product of claim 8, comprising greater than about 35 wt. % of the one or more plant protein sources.

10. The plant-based protein snack food product of claim 8, comprising greater than about 70 wt. % of the one or more plant protein sources.

11. The plant-based protein snack food product of claim 8, wherein the one or more plant protein sources includes a nut, grain, and/or legume protein.

12. The plant-based protein snack food product of claim 8, wherein the one or more plant protein sources includes pea protein, black bean protein, green bean protein, red bean protein, pinto bean protein, broad bean protein, mung bean protein, navy bean protein, chickpea protein, lentil protein, lupin bean protein, soy bean protein, peanut protein, alfalfa protein, wheat, wheat gluten, rice, corn, maize, oats, barley, sorghum, rye, millet, amaranth, buckwheat, bulgur, quinoa, pea fiber, soy fiber, oat fiber, corn fiber, sugar cane fiber, sugar beet fiber, and combinations thereof.

13. A method of producing a plant-based protein snack food product comprising:
   forming an in-barrel mixture within an extruder comprising 35 wt. % to about 90 wt. % of one or more plant protein sources, a plurality of dry ingredients, and a medium, the in-barrel mixture having an in-barrel moisture content ranging from about 40 wt. % to about 65 wt. %;
   heating the in-barrel mixture to a temperature that ranges from about 180° F. to about 320° F. to form a melt;
   extruding the melt through a perforation plate to form a plurality of fiber strands, each strand having a cross-sectional area ranging from about 6 mm² to about 8.5 mm²;
   passing the plurality of fiber strands through a receptor slit to compress and form one or more overlaid and cross-linked fiber strands in a vertical direction and a horizontal direction and that are substantially aligned in a flow direction;
   cooling the one or more overlaid and cross-linked fiber strands to a temperature that ranges from about 150° F. to about 210° F.

14. The method of claim 13, wherein the perforation plate has a plurality of perforations with each perforation having a diameter that ranges from about 2.5 mm to about 3.0 mm.

15. The method of claim 13, wherein the receptor slit has dimensions of about 4 mm in height by about 50 mm in width.

16. The method of claim 13, further comprising seasoning, tenderizing, marinating, or drying the extrudate.

17. A plant-based protein food product produced by the method of claim 13.

* * * * *